(12) United States Patent
Shimodaira

(10) Patent No.: US 7,830,591 B2
(45) Date of Patent: Nov. 9, 2010

(54) ACTIVE-MATRIX CIRCUIT BOARD AND DISPLAY

(75) Inventor: Yasuhiro Shimodaira, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 258 days.

(21) Appl. No.: 11/978,737

(22) Filed: Oct. 30, 2007

(65) Prior Publication Data

US 2008/0117497 A1 May 22, 2008

(30) Foreign Application Priority Data

| Nov. 20, 2006 | (JP) | ............................. 2006-312788 |
| Mar. 15, 2007 | (JP) | ............................. 2007-066839 |
| Mar. 22, 2007 | (JP) | ............................. 2007-074277 |

(51) Int. Cl.
*G02B 26/00* (2006.01)
*G09G 3/34* (2006.01)

(52) U.S. Cl. ........................................ 359/296; 345/107

(58) Field of Classification Search ............... 359/296; 349/39, 43, 54, 106, 149, 152; 345/107, 345/105
See application file for complete search history.

(56) References Cited

U.S. PATENT DOCUMENTS 5,270,693 A 12/1993 Wyler et al.
6,407,763 B1 * 6/2002 Yamaguchi et al. ......... 347/112
2005/0099552 A1 5/2005 Bang et al.
2007/0081108 A1 4/2007 Tsukada

FOREIGN PATENT DOCUMENTS

| EP | 1143311 A1 | 10/2001 |
| JP | 2001-075112 A | 3/2001 |
| WO | WO-03-081329 A1 | 10/2003 |

OTHER PUBLICATIONS

European Patent Search Report, Feb. 9, 2009, issued in related Patent Application No. EP-07254476.0.

* cited by examiner

*Primary Examiner*—Thompson J Timothy
*Assistant Examiner*—Tuyen Q Tra
(74) *Attorney, Agent, or Firm*—AdvantEdge Law Group, LLC

(57) ABSTRACT

An active-matrix circuit board includes a substrate including an avoided portion in a predetermined region thereof, one or more first pixel electrodes disposed around the avoided portion on the substrate, second pixel electrodes disposed on the substrate, pixel-driving circuits disposed on the substrate to drive the first and second pixel electrodes, wiring lines disposed on the substrate and connected to the pixel-driving circuits, and bypass line portions provided in the wiring lines so as to bypass the avoided portion. The first pixel electrodes are larger than the second pixel electrodes and have such a shape as to extend toward the avoided portion. The bypass line portions are disposed under the first pixel electrodes.

19 Claims, 20 Drawing Sheets

ACTIVE-MATRIX CIRCUIT BOARD AND DISPLAY

CROSS REFERENCES TO RELATED APPLICATIONS

This application claims priority to Japanese Patent Application No. 2006-312788 filed on Nov. 20, 2006, No. 2007-066839 filed on Mar. 15, 2007, and No. 2007-074277 filed on Mar. 22, 2007, the contents of which are incorporated herein by reference.

BACKGROUND

1. Technical Field

The present invention relates to active-matrix circuit boards including drive electrodes and wiring patterns and displays including the active-matrix circuit boards.

2. Related Art

A variety of display panels (displays) including electrooptical devices have recently been put to widespread use. Accordingly, studies have also been directed to the use of such display panels as display units of, for example, clocks and various instruments.

These display panels (displays) require, for example, through-holes through which pointers are attached to indicate time when used as display units of clocks or to indicate scales (numbers) when used as display units of various instruments. An example of a display panel having a through-hole is disclosed in JP-A-2001-75112, which proposes a liquid crystal display panel designed for STN liquid crystal which operates by passive-matrix driving.

There is a demand for the application of active-matrix driving, rather than passive-matrix driving, to display panels (displays) used in devices such as clocks so that the devices not only can simply display numbers such as time, but also can display calendar information, including dates and days, and other various built-in functions (including a timer function, a stopwatch function, and a radio reception function).

To apply active-matrix driving, however, wiring lines such as data lines and scan lines must be arranged in a matrix. If a through-hole is formed in an active-matrix circuit board used as a component of a display panel by, for example, drilling, as described above, the data lines and the scan lines are impaired at a position where the hole is formed. If the active-matrix circuit board is used in a display panel having a rectangular screen, for example, no display is provided in a cross region including the through-hole, that is, in a display region including pixel electrodes connected to wiring lines designed so as to extend through the through-hole. For a matrix display having a through-hole, therefore, wiring lines designed so as to extend through the through-hole are required to extend around the through-hole with portions of the wiring lines near the through-hole bypassing the through-hole.

The liquid crystal display panel disclosed in JP-A-2001-75112 above has a through-hole in its display region so that an analog indicating instrument can be used in combination. X and Y electrodes arranged around the through-hole include electrode portions arc-shaped about the axis of the through-hole with predetermined curvatures. This liquid crystal display panel can effectively utilize the space around the through-hole to allow dense wiring and a specific display around the through-hole. This publication, however, makes no consideration of active-matrix driving with a thin-film transistor (TFT) panel and thus cannot meet the demand for the application of active-matrix driving.

For high-definition active-matrix displays, as described above, wiring lines such as data lines (signal lines) and scan lines (scanning lines) are required to extend around and bypass a through-hole. If the wiring lines are arranged so as to bypass the through-hole, however, pixel-driving circuits for driving pixel electrodes cannot be arranged at positions where the wiring lines are formed. For high-definition displays, particularly, numerous wiring lines must be arranged so as to bypass the through-hole, and the regions where the pixel-driving circuits are formed are limited accordingly. As a result, the total display area is decreased because no display can be provided around the through-hole.

One possible approach to this problem is to allow sufficient space for the placement of the pixel-driving circuits, that is, to ensure sufficient spaces between the pixel-driving circuits, by lowering definition so that the wiring lines can extend through the spaces.

Another possible approach is to ensure a sufficient region where the pixel-driving circuits are formed near the through-hole by increasing the number of layers where the wiring lines are formed and forming the wiring lines in different layers so that the wiring lines do not interfere with each other. This allows the pixel electrodes for display to be provided near the through-hole.

The approach of lowering definition, however, decreases display quality and thus cannot provide a sufficiently valuable product even though the display region can be expanded to the vicinity of the through-hole and a larger display area is ensured thereby.

Also, the approach of increasing the number of layers where the wiring lines are formed correspondingly increases the number of manufacturing steps and thus significantly increases manufacturing costs.

SUMMARY

An advantage of some aspects of the invention is that they provide an active-matrix display that ensures a sufficient display area without decreased display quality and an active-matrix circuit board used as a component thereof.

An active-matrix circuit board according to a first aspect of the invention includes a substrate including an avoided portion in a predetermined region thereof, one or more first pixel electrodes disposed around the avoided portion on the substrate, second pixel electrodes disposed on the substrate, pixel-driving circuits disposed on the substrate to drive the first and second pixel electrodes, wiring lines disposed on the substrate and connected to the pixel-driving circuits, and bypass line portions provided in the wiring lines so as to bypass the avoided portion. The first pixel electrodes are larger than the second pixel electrodes and have such a shape as to extend toward the avoided portion. The bypass line portions are disposed under the first pixel electrodes.

The avoided portion preferably includes a hole.

In the active-matrix circuit board, some wiring lines include the bypass line portions, which extend around the avoided portion. The bypass line portions can avoid the problem that the pixel electrodes connected to these wiring lines provide no display. In addition, the first pixel electrodes are disposed around the avoided portion, are larger than the second pixel electrodes, and have such a shape as to extend toward the avoided portion. This allows a display region around the avoided portion to be widened by the length of portions of the first pixel electrodes extending toward the avoided portion. Furthermore, the bypass line portions are disposed under the first pixel electrodes to avoid the problem that the bypass line portions interfere with the pixel-driving circuits. The active-matrix circuit board according to the first aspect of the invention can therefore be readily and successfully applied to a display with particularly high resolution (definition) in which numerous wiring lines require bypassing.

In the above active-matrix circuit board, each of the first pixel electrodes may be provided with at least one of the pixel-driving circuits.

For example, each of the first pixel electrodes may be provided with one of the pixel-driving circuits.

The first pixel electrodes can then provide a high-definition display in the vicinity of the avoided portion.

Alternatively, for example, each of the first pixel electrodes may be provided with a plurality of the pixel-driving circuits.

The first pixel electrodes can then provide a high-definition display in the vicinity of the avoided portion.

In addition, each of the first pixel electrodes can be driven by a plurality of the pixel-driving circuits. If the plurality of the pixel-driving circuits executes the same operation to cooperate with each other, for example, the first pixel electrodes, which are larger than the second pixel electrodes, can generate an electric field equivalent to that generated by the second pixel electrodes.

In the above active-matrix circuit board, alternatively, the active-matrix circuit board may include only one first pixel electrode, and the first pixel electrode may be provided with a plurality of the pixel-driving circuits.

The first pixel electrode can be driven by a plurality of the pixel-driving circuits. If the plurality of the pixel-driving circuits executes the same operation to cooperate with each other, for example, the first pixel electrode, which is larger than the second pixel electrodes, can generate an electric field equivalent to that generated by the second pixel electrodes.

In the above active-matrix circuit board, at least part of the avoided portion may be disposed in a display region.

For example, the entire avoided portion may be disposed in a region corresponding to the display region of the display.

In this case, the widening of the display region around the avoided portion is more effective because the avoided portion occupies a large area in the display region.

Alternatively, for example, only part of the avoided portion may be disposed in the region corresponding to the display region of the display.

In this case, the active-matrix circuit board can be applied to a display having a relatively narrow display region. In particular, the active-matrix circuit board can readily be applied to a display having a narrow display region designed for suppressed power consumption and increased battery life.

It is preferred that a display include a first substrate, a second substrate disposed opposite the first substrate, an electrooptical material layer held between the first and second substrates, and a counter electrode disposed on a surface of the second substrate opposite the first substrate. The first substrate is the active-matrix circuit board described above. The pixel electrodes are disposed on a surface of the first substrate opposite the second substrate.

This display avoids the problem that some pixel electrodes provide no display and allows widening of the display region around the avoided portion, as described above. In addition, the first substrate of the display is the active-matrix circuit board described above, which avoids the problem that the bypass line portions hinder the placement of the pixel-driving circuits. The display can therefore ensure a large display area without decreased display quality and does not involve significantly increased manufacturing costs because the number of wiring layers is not increased.

In the above display, the electrooptical material is preferably an electrophoretic dispersion including electrophoretic particles and a liquid dispersion medium in which the electrophoretic particles are dispersed.

In this case, the display includes electrophoretic elements having the ability to maintain a display (memory effect). When a displayed image is retained, for example, an electric field being applied to the electrophoretic particles can be terminated with the displayed image being maintained by the effect of the electric field previously applied. This contributes to reduced power consumption.

An active-matrix circuit board according to a second aspect of the invention includes a substrate including an avoided portion in a predetermined region thereof, pixel electrodes disposed on the substrate, drive circuits disposed on the substrate to drive the pixel electrodes, wiring lines disposed on the substrate, and one or more connection portions disposed in a region surrounding the avoided portion on the substrate. The wiring lines include power lines electrically connected to the drive circuits. Some of the wiring lines include bypass portions bypassing the avoided portion. The connection portions are connected to and integrate some of the power lines.

According to the second aspect of the invention, the connection portions are connected to and integrate a predetermined number of power lines connected to the drive circuits for driving the pixel electrodes in the region surrounding the avoided portion on the substrate. The integration of the power lines can correspondingly reduce the space where they are arranged. The connection portions can bypass the avoided portion while reducing the space for the power lines, thus providing a correspondingly increased display area. The avoided portion includes, for example, a region where the wiring lines cannot be physically arranged, such as a through-hole in the substrate, and a region where the wiring lines cannot be arranged because of the risk of causing a short-circuit, such as a region where other wiring lines are arranged.

In the above active-matrix circuit board, the connection portions are preferably disposed around the outermost circumference of the bypass portions of the wiring lines with respect to the avoided portion.

In this case, the power lines can readily be integrated because the connection portions are disposed around the outermost circumference of the bypass portions of the wiring lines with respect to the avoided portion. This minimizes the space for bypassing of the avoided portion.

In the above active-matrix circuit board, the connection portions are preferably connected to all of the power lines.

In this case, the space for arranging the power lines can be significantly reduced because the connection portions are connected to all of the power lines.

In the above active-matrix circuit board, the connection portions are preferably disposed in an annular pattern so as to surround the avoided portion.

In this case, the power lines can be integrated by being connected to the connection portions at any positions around the avoided portion because the connection portions are disposed in an annular pattern so as to surround the avoided portion. This facilitates bypassing of the avoided portion.

It is preferred that a display include a first substrate, a second substrate disposed opposite the first substrate, an electrooptical material layer held between the first and second substrates, and a counter electrode disposed on a surface of the second substrate opposite the first substrate. The first substrate is the active-matrix circuit board described above. The pixel electrodes are disposed on a surface of the first substrate opposite the second substrate.

This display includes the active-matrix circuit board described above, which allows the wiring lines to bypass the avoided portion while reducing the space for the wiring lines, thus providing a large display area. Thus, an active-matrix display can be provided which ensures a large display area without decreased display quality or significantly increased manufacturing costs.

In the above display, the electrooptical material is preferably an electrophoretic dispersion including electrophoretic particles and a liquid dispersion medium in which the electrophoretic particles are dispersed.

In this case, the display includes electrophoretic elements having the ability to maintain a display (memory effect). When a displayed image is retained, for example, an electric field being applied to the electrophoretic particles can be terminated with the displayed image being maintained in a state established by the electric field previously applied. This contributes to reduced power consumption.

An active-matrix circuit board according to a third aspect of the invention includes a substrate including an avoided portion in a predetermined region thereof, pixel electrodes disposed on the substrate, drive circuits disposed on the substrate to drive the pixel electrodes, and wiring lines disposed in a layer different from a layer in which the pixel electrodes are disposed on the substrate. At least one of the pixel electrodes connects some of the wiring lines in a region surrounding the avoided portion.

According to the third aspect of the invention, at least one of the pixel electrodes, which are disposed in the layer different from the layer in which the wiring lines are disposed, connects some of the wiring lines in the region surrounding the avoided portion. These wiring lines can bypass the avoided portion through the pixel electrode. The bypassing through the pixel electrode can correspondingly reduce the number of wiring lines bypassing the avoided portion to minimize the area of a region where the wiring lines bypass the avoided portion, thus providing a correspondingly increased display area. The avoided portion includes, for example, a region where the wiring lines cannot be physically arranged, such as a through-hole in the substrate, and a region where the wiring lines cannot be arranged because of the risk of causing a short-circuit, such as a region where other wiring lines are arranged.

In the above active-matrix circuit board, the pixel electrode connecting the wiring lines in the region surrounding the avoided portion is preferably disposed in the region surrounding the avoided portion.

In this case, the length of the wiring lines bypassing the avoided portion can be minimized because the pixel electrode connecting the wiring lines in the region surrounding the avoided portion is disposed in the region surrounding the avoided portion.

In the above active-matrix circuit board, the pixel electrode disposed in the region surrounding the avoided portion preferably has such a shape as to surround the avoided portion in plan view.

In this case, the length of the wiring lines bypassing the avoided portion can be further reduced because the pixel electrode disposed in the region surrounding the avoided portion has such a shape as to surround the avoided portion in plan view.

The active-matrix circuit board preferably further includes an annular electrode disposed around the avoided portion in the same layer as the wiring lines to connect some of the wiring lines.

In this case, some of the wiring lines can bypass the avoided portion through the annular electrode disposed around the avoided portion in the same layer as the wiring lines to connect the wiring lines. The pixel electrode and the annular electrode can thus be used in combination to synergistically reduce the area of the region where the wiring lines bypass the avoided portion.

In the above active-matrix circuit board, the wiring lines connected to the pixel electrode are preferably wiring lines for supplying power to the drive circuits.

In this case, a display pattern similar to that of segment driving can be provided because the wiring lines connected to the pixel electrode are wiring lines for supplying power to the drive circuits, namely, power lines. This case is preferred for metal pixel electrodes because of their low electrical resistance. In addition, if each drive circuit requires only one power line, the area of the region where the wiring lines bypass the avoided portion can be minimized because the power lines do not have to be bypassed.

In the above active-matrix circuit board, the wiring lines connected to the pixel electrode are preferably wiring lines for grounding the drive circuits.

In this case, a ground pattern can be reinforced because the wiring lines connected to the pixel electrode are wiring lines for grounding the drive circuits, namely, ground lines.

It is preferred that a display include a first substrate, a second substrate disposed opposite the first substrate, an electrooptical material layer held between the first and second substrates, and a counter electrode disposed on a surface of the second substrate opposite the first substrate. The first substrate is the active-matrix circuit board described above. The pixel electrodes are disposed on a surface of the first substrate opposite the second substrate.

This display includes the active-matrix circuit board described above, which can minimize the area of the region where the wiring lines bypass the avoided portion in the layer where the wiring lines are disposed. Thus, an active-matrix display can be provided which ensures a large display area without decreased display quality or significantly increased manufacturing costs.

In the above display, the electrooptical material is preferably an electrophoretic dispersion including electrophoretic particles and a liquid dispersion medium in which the electrophoretic particles are dispersed.

In this case, the display includes electrophoretic elements having the ability to maintain a display (memory effect). When a displayed image is retained, for example, an electric field being applied to the electrophoretic particles can be terminated with the displayed image being maintained in a state established by the electric field previously applied. This contributes to reduced power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will now be described.

Figure 1:
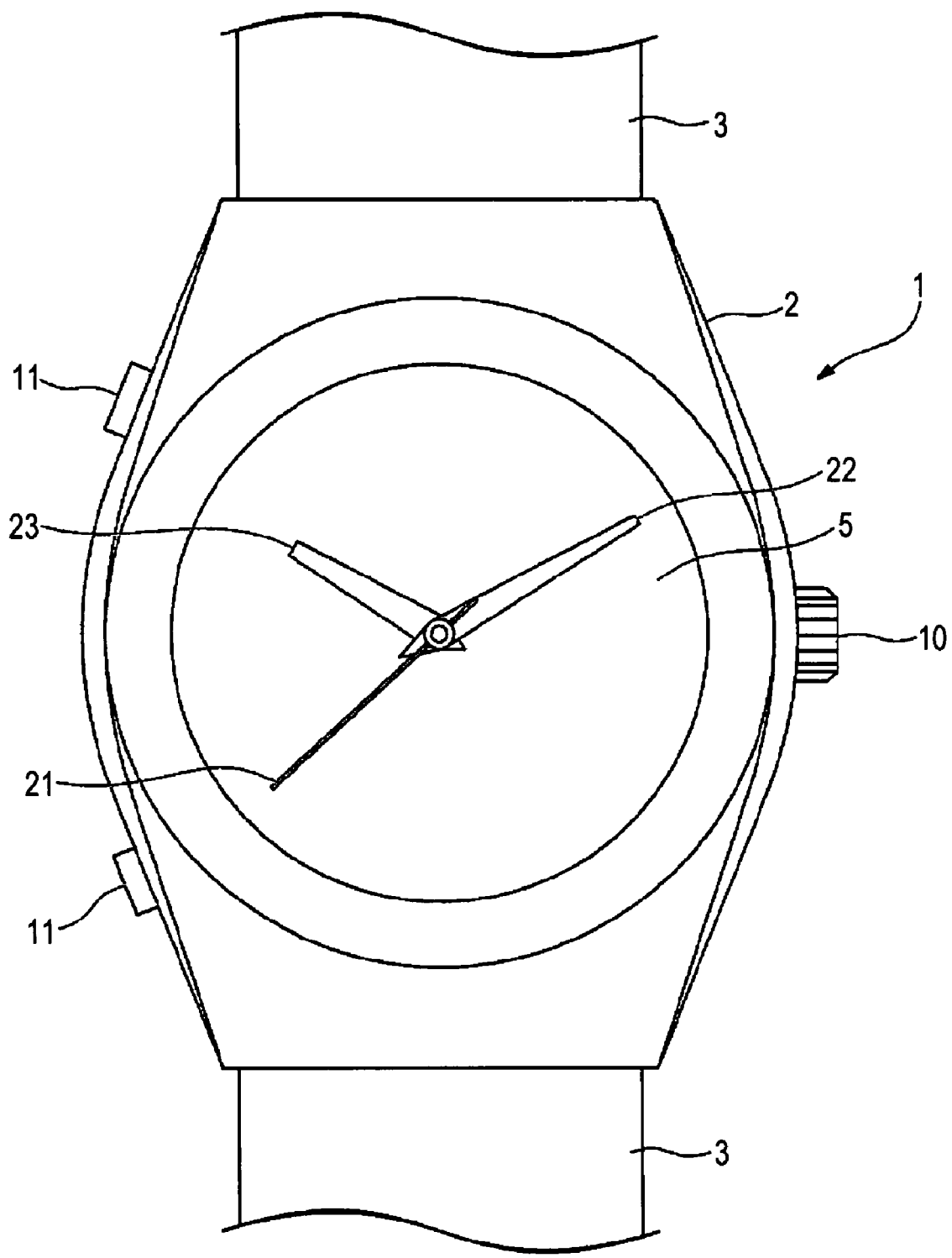
FIG. 1 is a front view of a wristwatch including a display according to a first embodiment of the invention.
Figure 2:
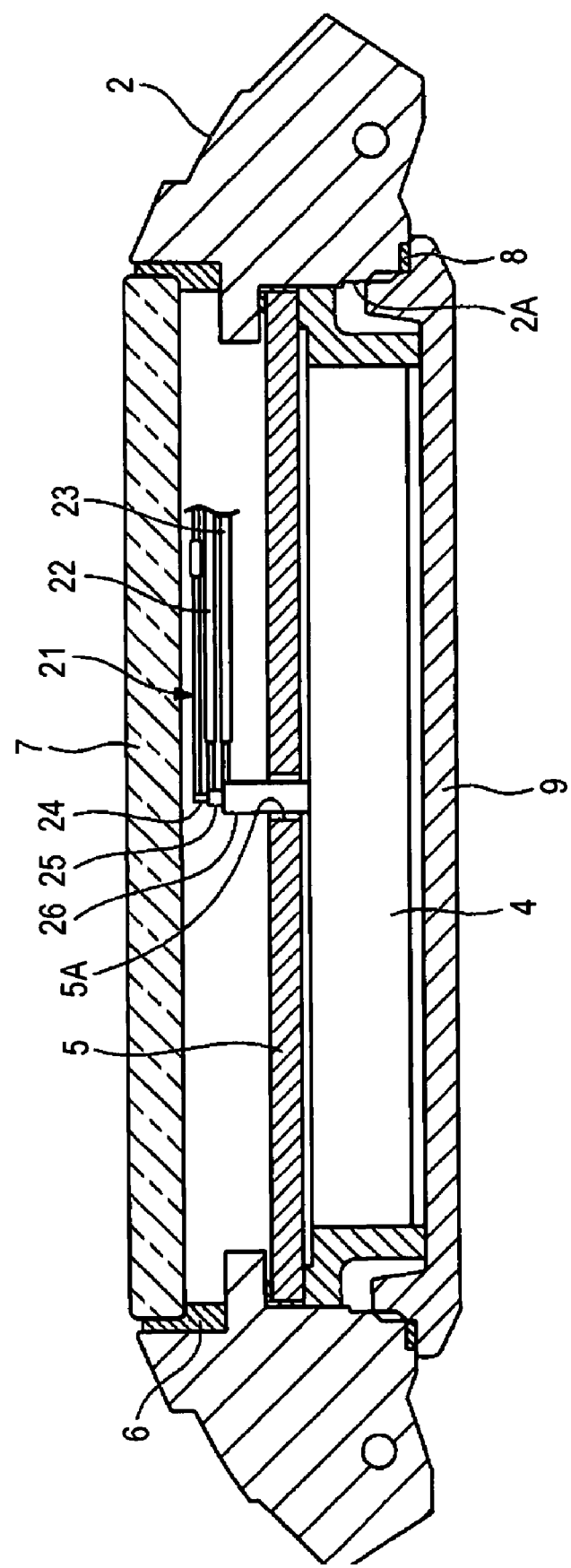
FIG. 2 is a side sectional view of the wristwatch according to the first embodiment of the invention.

FIG. 1 is a front view of a wristwatch 1 including a display panel 5. This display panel 5 is a display according to the first embodiment of the invention. FIG. 2 is a side sectional view of the wristwatch 1.

In FIG. 1, the wristwatch 1 includes a watch case 2 and a pair of bands 3 joined to the watch case 2. The watch case 2 is formed of a metal such as stainless steel or a resin such as plastic resin. In FIG. 2, a movement 4 and the display panel 5 are accommodated in an internal accommodation portion 2A of the watch case 2.

A glass or resin transparent cover 7 is press-fitted and fixed to an end of the accommodation portion 2A of the watch case 2 (in the front of the wristwatch 1) with a resin or metal press-fit ring 6 disposed therebetween while a back cover 9 is screwed into the opposite end of the accommodation portion 2A (in the back of the wristwatch 1) with a gasket 8 disposed therebetween. In this structure, the back cover 9 and the transparent cover 7 ensure the hermeticity of the watch case 2.

In FIG. 1, the watch case 2 has a crown 10 and operating buttons 11 functioning as operating portions. The crown 10 is joined to a winding stem (not shown) of the movement 4 so that the crown 10 can be pushed and pulled stepwise (for example, in two steps) and be rotated integrally with the winding stem.

The movement 4 includes a hand-moving mechanism (not shown) joined to analog pointers, namely, a second hand 21, a minute hand 22, and an hour hand 23. The hand-moving mechanism rotates the analog pointers 21 to 23, thus functioning as a time indicator for indicating the time as adjusted.

In FIG. 2, the display panel 5 is disposed in front of the movement 4 to constitute a display unit of the wristwatch 1. In this embodiment, the display panel 5 is an active-matrix electrophoretic display panel having, for example, a circular, regular octagonal, or hexadecagonal display surface. The display panel 5 has a through-hole 5A formed in the center thereof. A second wheel 24, a center wheel 25, and an hour wheel 26 of the hand-moving mechanism (not shown) of the movement 4 protrude from the through-hole 5A. The second hand 21, the minute hand 22, and the hour hand 23 are attached to ends of the respective wheels 24, 25, and 26.

Figure 3:
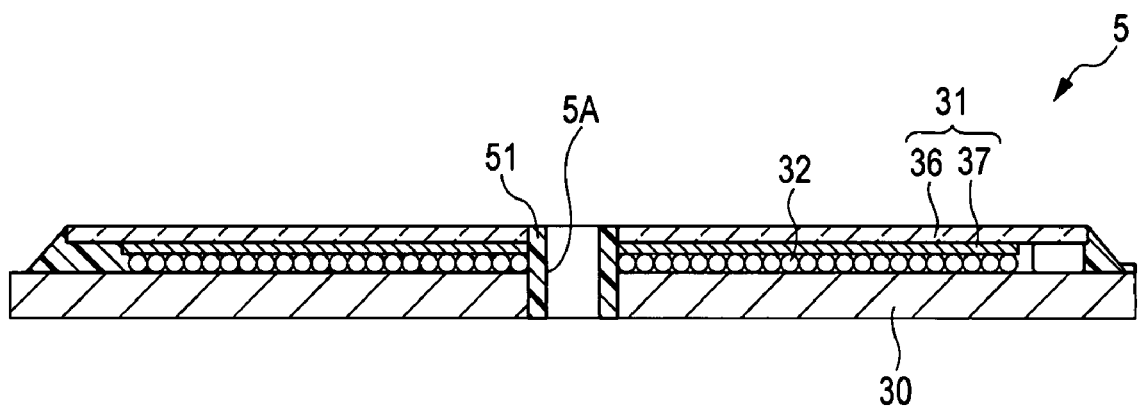
FIG. 3 is a side sectional view of the display panel according to the first embodiment of the invention.

Referring to FIG. 3, the display panel 5 includes a first substrate 30, a second substrate 31, and an electrophoretic layer 32 disposed therebetween.

Figure 4:
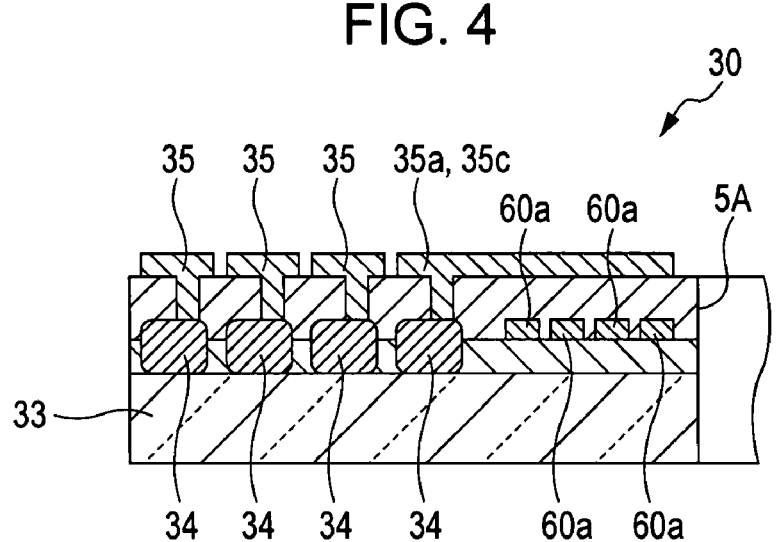
FIG. 4 is a side sectional view of a fundamental part of an example of an active-matrix circuit board according to the first embodiment of the invention.

The first substrate 30 is an active-matrix circuit board according to an embodiment of the invention, as described later. Referring to FIG. 4, the first substrate 30 includes a glass substrate 33, many pixel-driving circuits 34 arranged on an inner surface of the glass substrate 33, and pixel electrodes 35 disposed above the pixel-driving circuits 34.

The second substrate 31 is disposed on the display-surface side of the display panel 5. In FIG. 3, the second substrate 31 includes a transparent substrate 36 formed of, for example, glass or plastic and a transparent common electrode (counter electrode) 37 formed of, for example, indium tin oxide (ITO) on an inner surface of the transparent substrate 36.

Figure 5A:
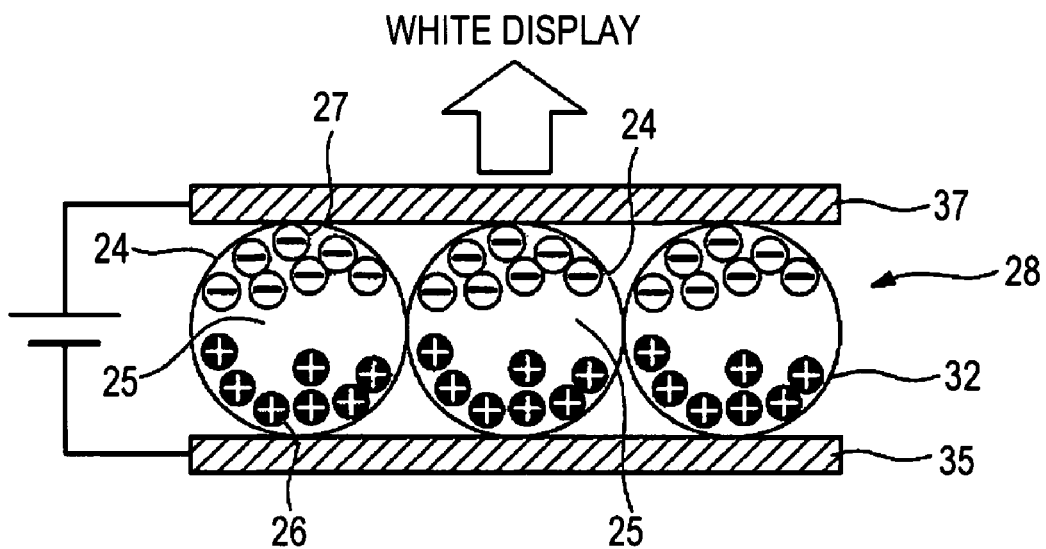
FIGS. 5A and 5B are diagrams illustrating the operation of an electrophoretic element in the first embodiment of the invention.
Figure 5B:
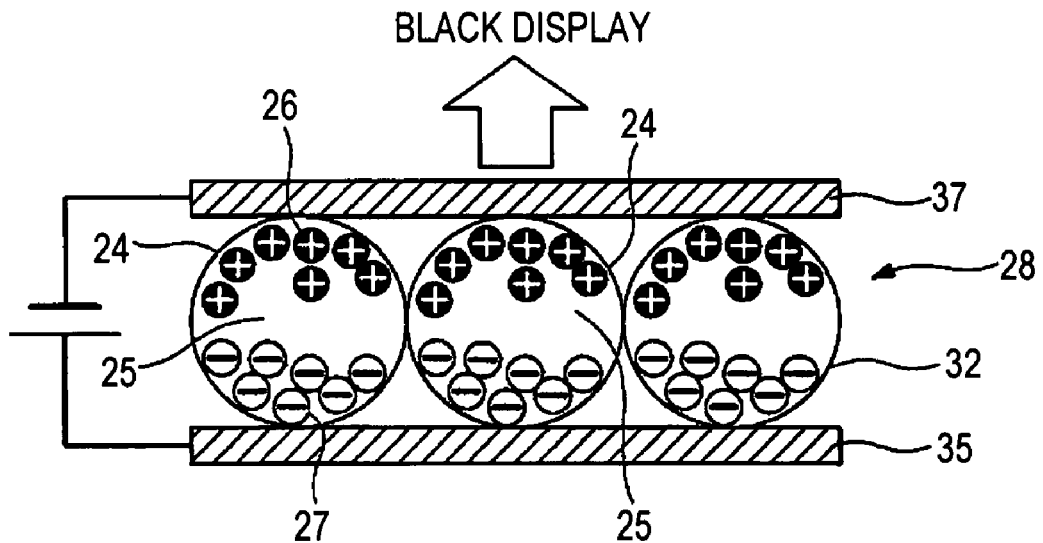

Referring to FIGS. 5A and 5B, the electrophoretic layer 32 includes many microcapsules 24. An electrophoretic dispersion 25 is sealed in the microcapsules 24. The electrophoretic dispersion 25, which is an electrooptical material, contains a large number of positively charged black electrophoretic particles (hereinafter referred to as black particles) 26 and negatively charged white electrophoretic particles (hereinafter referred to as white particles) 27 dispersed in a liquid dispersion medium (not shown).

The operation of an electrophoretic element 28 including the pixel electrode 35, the common electrode 37, and the electrophoretic layer 32 (microcapsules 24) held therebetween will now be described. In FIG. 5A, if the potential of the common electrode 37 is higher than that of the pixel electrode 35, the negatively charged white particles 27 move (migrate) to the common electrode 37 side while the positively charged black particles 26 move (migrate) to the pixel electrode 35 side. In this state, a pixel corresponding to the electrophoretic element 28 looks white when viewed from the common electrode 37 side, that is, from the display-surface side.

In FIG. 5B, if the potential of the pixel electrode 35 is higher than that of the common electrode 37, the positively charged black particles 26 move (migrate) to the common electrode 37 side while the negatively charged white particles 27 move (migrate) to the pixel electrode 35 side. In this state, the pixel corresponding to the electrophoretic element 28 looks black when viewed from the common electrode 37 side. Thus, each pixel provides a black or white display, so that the display panel 5, on which pixels are basically arranged in a two-dimensional matrix, can create a black and white display pattern.

The electrophoretic dispersion 25 is not limited to a system including two types of particles, but can also be a system including one type of particles. In this case, a colored liquid dispersion medium can be used. In addition, various particle colors other than black and white can be used either for a system including two types of particles or for a system including one type of particles.

Figure 6:
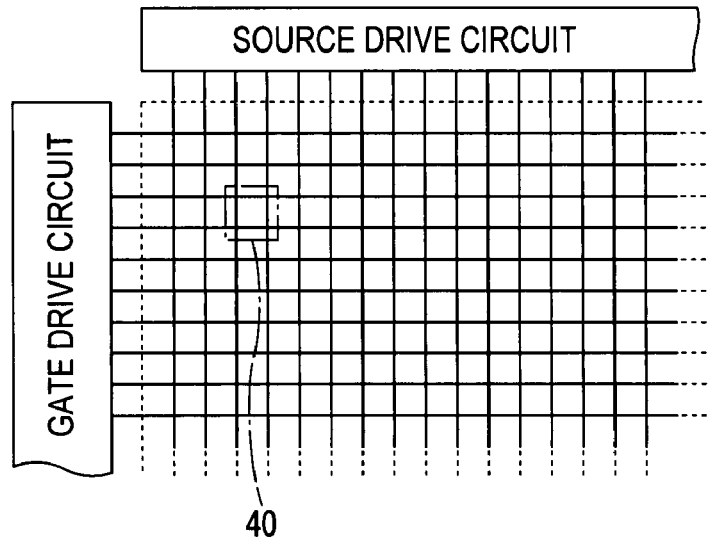
FIG. 6 is a diagram showing a display region other than a region surrounding a through-hole in the first embodiment of the invention.
Figure 7:
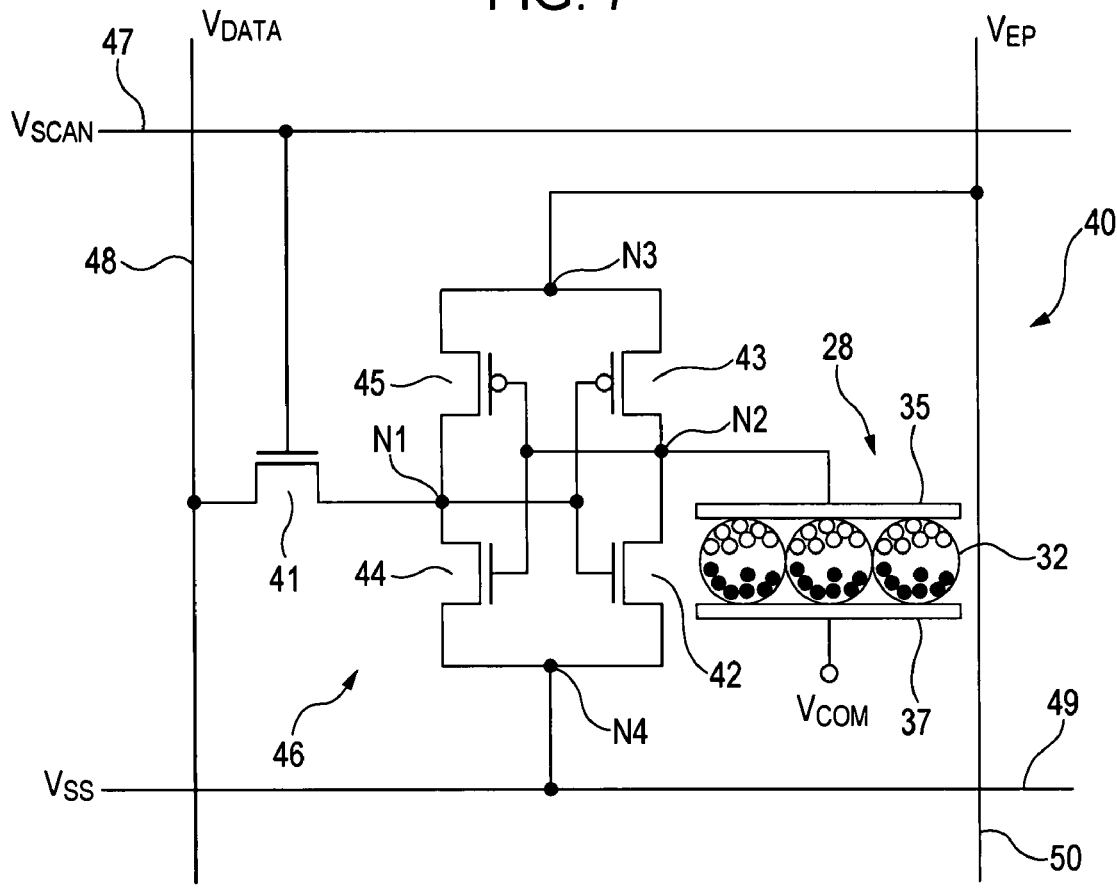
FIG. 7 is an equivalent circuit diagram of a pixel in the first embodiment of the invention.

Referring to FIG. 6, pixels 40 are regularly arranged in a two-dimensional matrix in a display region other than a region surrounding the through-hole 5A. Each pixel 40 includes the electrophoretic element 28 and the pixel-driving circuit 34 connected to the pixel electrode 35. In the circuit diagram of FIG. 7, specifically, each pixel 40 includes a transistor 41 serving as a switching element, a latch circuit 46 including four combined transistors 42 to 45, and the electrophoretic element 28. In this embodiment, particularly, the transistor 41 and the latch circuit 46 constitute the pixel-driving circuit 34.

The transistor 41 is, for example, an n-channel field-effect transistor. A gate of the transistor 41 is connected to a scanning line (scan line) 47. One source/drain (input terminal) of the transistor 41 is connected to a data line (signal line) 48 while the other source/drain (output terminal) is connected to an input terminal of the latch circuit 46.

The latch circuit (flip-flop circuit) 46 is, for example, a combination of the two n-channel field-effect transistors 42 and 44 the two p-channel field-effect transistors 43 and 45. Specifically, one source/drain of the transistor 42 is connected to the corresponding source/drain of the transistor 43. The other source/drain of the transistor 42 is connected to a low-voltage power line 49 while the other source/drain of the transistor 43 is connected to a high-voltage power line 50. Similarly, one source/drain of the transistor 44 is connected to the corresponding source/drain of the transistor 45. The other source/drain of the transistor 44 is connected to the low-voltage power line 49 while the other source/drain of the transistor 45 is connected to the high-voltage power line 50.

The gates of the transistors 42 and 43 are connected to one source/drain of the transistor 44 and the corresponding source/drain of the transistor 45 at a node N1. The node N1 functions as the input terminal of the latch circuit 46. The input terminal N1 is connected to the other source/drain (output terminal) of the transistor 41. The gates of the transistors 44 and 45 are connected to one source/drain of the transistor 42 and the corresponding source/drain of the transistor 43 at a node N2. The node N2 functions as the output terminal of the latch circuit 46. The output terminal N2 of the latch circuit 46 is connected to the pixel electrode 35, that is, one electrode of the electrophoretic element 28. In the latch circuit 46 having the above configuration, a low potential $V_{SS}$ appears at the output terminal N2 if a high potential is applied to the input terminal N1 while a high potential $V_{EP}$ appears at the output terminal N2 if a low potential is applied to the input terminal N1.

Figure 8:
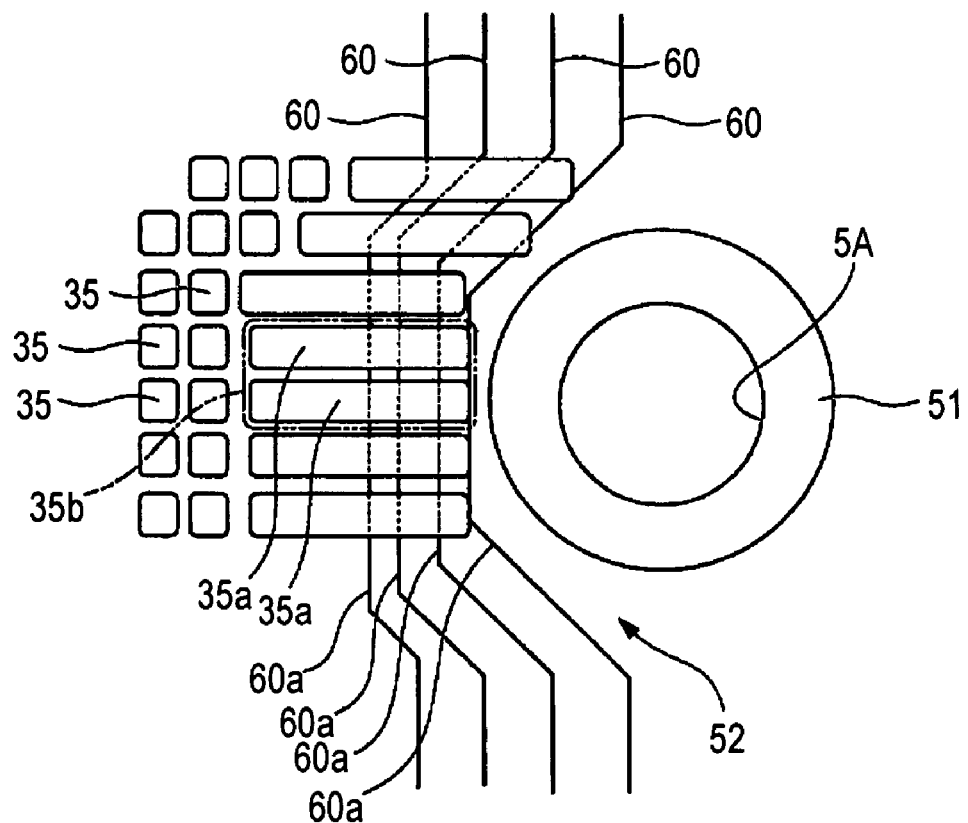
FIG. 8 is a schematic plan view of a fundamental part of the region surrounding the through-hole in the first embodiment of the invention.

As shown in FIG. 6, wiring lines connected to the pixel-driving circuits 34 are linearly arranged in a matrix in the display region other than the region surrounding the through-hole 5A, as described above. The wiring lines include the scanning lines (scan lines) 47 and data lines (signal lines) 48 connected to the transistors 41 and the low-voltage power lines 49 and high-voltage power lines 50 connected to the latch circuits 46. Of the wiring lines such as the scanning lines 47 and the data lines 48 (hereinafter collectively referred to as wiring lines 60), as shown in FIG. 8, the wiring lines 60 positioned so as to overlap the through-hole 5A in design include bypass line portions 60a extending around and bypassing the through-hole 5A in the region surrounding the through-hole 5A. The wiring lines 60 positioned so as to overlap the through-hole 5A in design refer to wiring lines 60 that would be disposed so as to overlap a region where the through-hole 5A is formed if the through-hole 5A were not formed.

A sealing portion 51 is formed around the through-hole 5A to seal the circumference of the through-hole 5A. The wiring lines 60 cannot extend through the sealing portion 51. In this embodiment, therefore, an avoided portion 52 includes the through-hole 5A and the sealing portion 51. Of the wiring lines 60, the bypass line portions 60a are provided not only in the wiring lines 60 positioned so as to overlap the through-hole 5A in design, but also in the wiring lines 60 positioned so as to overlap the sealing portion 51 in design, extending around and bypassing the sealing portion 51.

In FIG. 8, the bypass line portions 60a are also provided in the wiring lines 60 positioned near the wiring lines 60 including the bypass line portions 60a to avoid contact with the adjacent bypass line portions 60a. In this embodiment, the bypass line portions 60a are similarly provided in such wiring lines 60. In this embodiment, the avoided portion 52 not only includes the through-hole 5A and the sealing portion 51, but also includes the bypass line portions 60a positioned near the through-hole 5A and the sealing portion 51.

The pixel electrodes 35 of the pixels (not shown) positioned around the through-hole 5A, namely, surrounding pixel electrodes (first pixel electrodes) 35a, are larger than the other pixel electrodes (second pixel electrodes) 35. In this embodiment, the surrounding pixel electrodes 35a are formed so as to extend laterally (or longitudinally) toward the through-hole 5A in a direction in which the pixel electrodes 35, including the surrounding pixel electrodes 35a, are arranged. That is, the surrounding pixel electrodes 35a are formed so as to extend toward the through-hole 5A.

The bypass line portions 60a of the wiring lines 60 are disposed under portions of the surrounding pixel electrodes 35a extending toward the through-hole 5A (between the glass substrate 33 and the surrounding pixel electrodes 35a). Referring back to FIG. 4, the pixel-driving circuits 34 connected to the surrounding pixel electrodes 35a are disposed at the positions farthest from the through-hole 5A under the surrounding pixel electrodes 35a to prevent the bypass line portions 60a from interfering with the pixel-driving circuits 34. The bypass line portions 60a are disposed beside the pixel-driving circuits 34.

In this embodiment, each of the surrounding pixel electrodes 35a is provided with one pixel-driving circuit 34 so that the surrounding pixel electrodes 35a can be controlled independently of each other.

Figure 9:
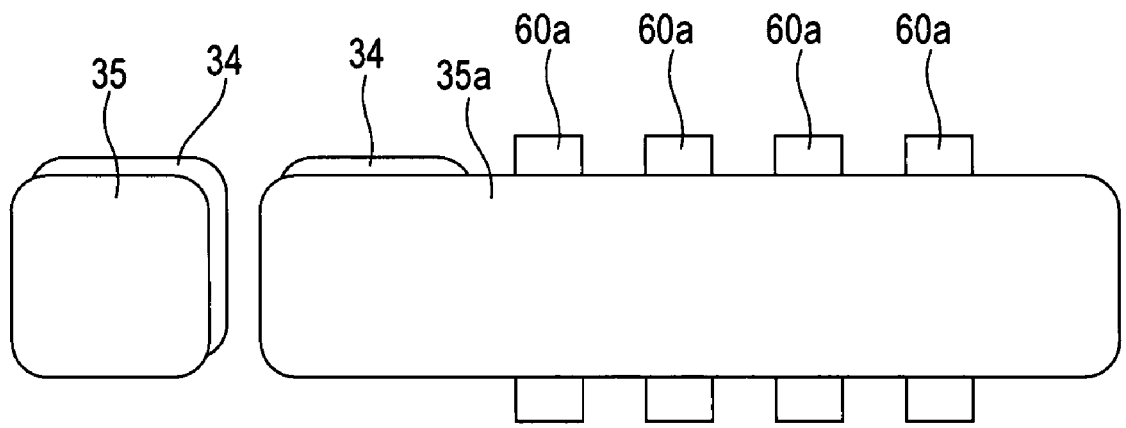
FIG. 9 is an enlarged plan view of a surrounding pixel electrode in the first embodiment of the invention.

As shown in FIGS. 4 and 9, the area of the surrounding pixel electrodes 35a is four times that of the other pixel electrodes 35 in this embodiment. Four bypass line portions 60a are arranged under the extending portions of the surrounding pixel electrodes 35a. Although not shown, the gate width W2 of the transistors 41, functioning as switching elements, of the pixel-driving circuits 34 connected to the surrounding pixel electrodes 35a is larger than the gate width W1 of the transistors 41 of the pixel-driving circuits 34 connected to the other pixel electrodes 35. Specifically, the ratio of the gate width W2 to the gate width W1 may be equal to the area ratio of the pixel electrodes 35, namely, 4:1. Alternatively, the gate width W2 may be higher or lower than the above ratio. For the transistors 42 to 45, additionally, the gate width ratio may be equal to the area ratio of the pixel electrodes 35, namely, 4:1, so that the latch circuits 46 can operate stably. Alternatively, the gate width may be higher or lower than the above ratio.

The latch circuits 46 of the pixel-driving circuits 34 may be replaced with capacitors. In this case, preferably, the capacitance of the capacitors of the pixel-driving circuits 34 connected to the surrounding pixel electrodes 35a and the capacitance of the capacitors of the pixel-driving circuits 34 connected to the other pixel electrodes 35 vary according to the area ratio of the pixel electrodes 35.

If the gate width W2 or the capacitance varies according to the area ratio of the pixel electrodes 35, the potential applied to the surrounding pixel electrodes 35a, which are larger than the other pixel electrodes 35e, can be equivalent to that applied to the other pixel electrodes 35. Accordingly, the electrophoretic elements 28 including the surrounding pixel electrodes 35a can provide a display equivalent to that provided by the electrophoretic elements 28 including the other pixel electrodes 35.

In the display panel 5 of the wristwatch 1 having the structure described above, the bypass line portions 60a are provided in the wiring lines 60 positioned on the first substrate 30 so as to overlap the avoided portion 52 (including the through-hole 5A and the sealing portion 51) in design. The bypass line portions 60a can avoid the problem that the pixel electrodes 35 connected to these wiring lines 60 provide no display. In addition, the surrounding pixel electrodes 35a disposed around the through-hole 5A are larger than the other pixel electrodes 35 and extend toward the through-hole 5A. This allows the display region around the through-hole 5A to be widened by the length of the portions of the surrounding pixel electrodes 35a extending toward the through-hole 5A. Furthermore, the bypass line portions 60a are disposed under the portions of the surrounding pixel electrodes 35a extending toward the through-hole 5A to avoid the problem that the bypass line portions 60a interfere with the pixel-driving circuits 34. The structure according to this embodiment can thus be readily and successfully applied to the display panel 5, which has particularly high resolution (definition) and in which numerous wiring lines 60 require bypassing. The display panel 5 can therefore ensure a large display area without decreased display quality and does not involve significantly increased manufacturing costs because the number of wiring layers is not increased.

In addition, each of the surrounding pixel electrodes 35a is provided with one pixel-driving circuit 34 so that the surrounding pixel electrodes 35a can be controlled independently of each other. The surrounding pixel electrodes 35a can therefore provide a high-definition display in the vicinity of the through-hole 5A.

In addition, the electrophoretic elements 28 are used as electrooptical elements of the display panel 5. The electrophoretic elements 28 have the ability to maintain a display (memory effect). When a character panel, for example, is displayed on the display panel 5 as a displayed image, that is, when a displayed image is retained, an electric field being applied to the electrophoretic particles can be terminated with the displayed image being maintained by the effect of the electric field previously applied. This contributes to reduced power consumption.

Although each of the surrounding pixel electrodes 35a is provided with one pixel-driving circuit 34 in this embodiment, the invention is not limited to this example, and each of the surrounding pixel electrodes 35a may be provided with a plurality of pixel-driving circuits 34. In FIG. 8, for example, two adjacent surrounding pixel electrodes 35a may be integrated into a single surrounding pixel electrode 35b, as indicated by the two-dot chain line of FIG. 8. In this case, the surrounding pixel electrode 35b is connected to two pixel-driving circuits 34.

The single surrounding pixel electrode 35b can therefore be driven by the plurality of pixel-driving circuits 34. If the plurality of pixel-driving circuits 34 executes the same operation to cooperate with each other, for example, the surrounding pixel electrode 35b, which is larger than the other pixel electrodes 35, can generate an electric field equivalent to that generated by the other pixel electrodes 35. Accordingly, the electrophoretic element 28 including the surrounding pixel electrode 35b can provide a display equivalent to that provided by the electrophoretic elements 28 including the other pixel electrodes 35.

In this example, the display panel 5 includes the plurality of surrounding pixel electrodes 35a. These surrounding pixel electrodes 35a can provide a high-definition display in the vicinity of the through-hole 5A.

Figure 10:
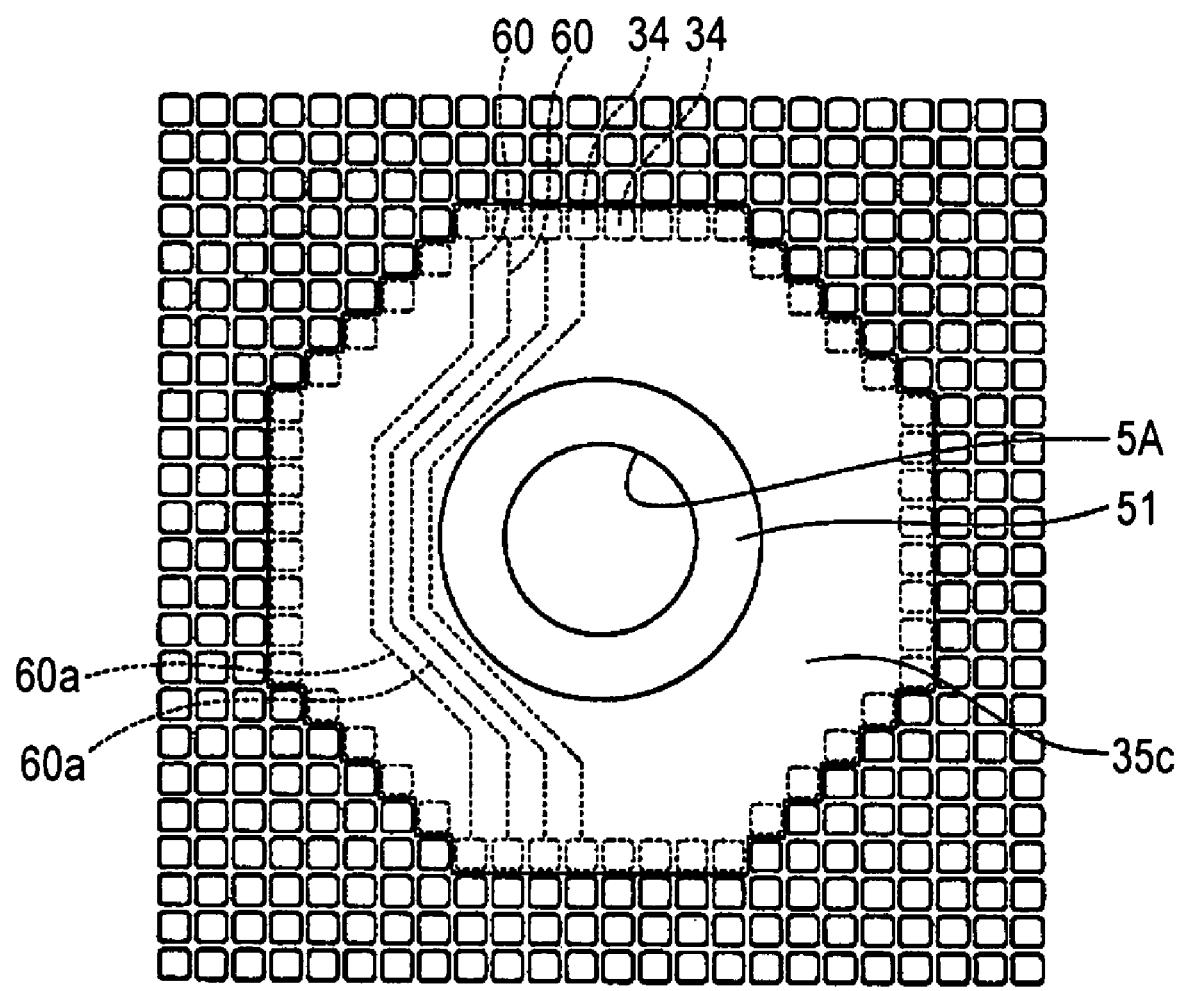
FIG. 10 is a schematic plan view of the region surrounding the through-hole in the first embodiment of the invention.

Alternatively, the display panel 5 may include only one surrounding pixel electrode 35c, as shown in FIG. 10. In this case, all pixel-driving circuits 34 disposed around and closest to the through-hole 5A may be connected to the surrounding pixel electrode 35c. The surrounding pixel electrode 35c is formed in an annular shape extending from above the pixel-driving circuits 34 connected to the surrounding pixel electrode 35c toward the through-hole 5A when viewed in cross section. Although only some of the wiring lines 60 are shown (indicated by the hidden lines) in FIG. 10 for illustrative purposes, more wiring lines 60 than shown are actually formed.

As in the above example, therefore, the single surrounding pixel electrode 35c can be driven by the plurality of pixel-driving circuits 34. If the plurality of pixel-driving circuits 34 executes the same operation to cooperate with each other, for example, the surrounding pixel electrode 35c can generate an electric field equivalent to that generated by the other pixel electrodes 35. Accordingly, the electrophoretic element 28 including the surrounding pixel electrode 35c can provide a display equivalent to that provided by the electrophoretic elements 28 including the other pixel electrodes 35.

Figure 11:
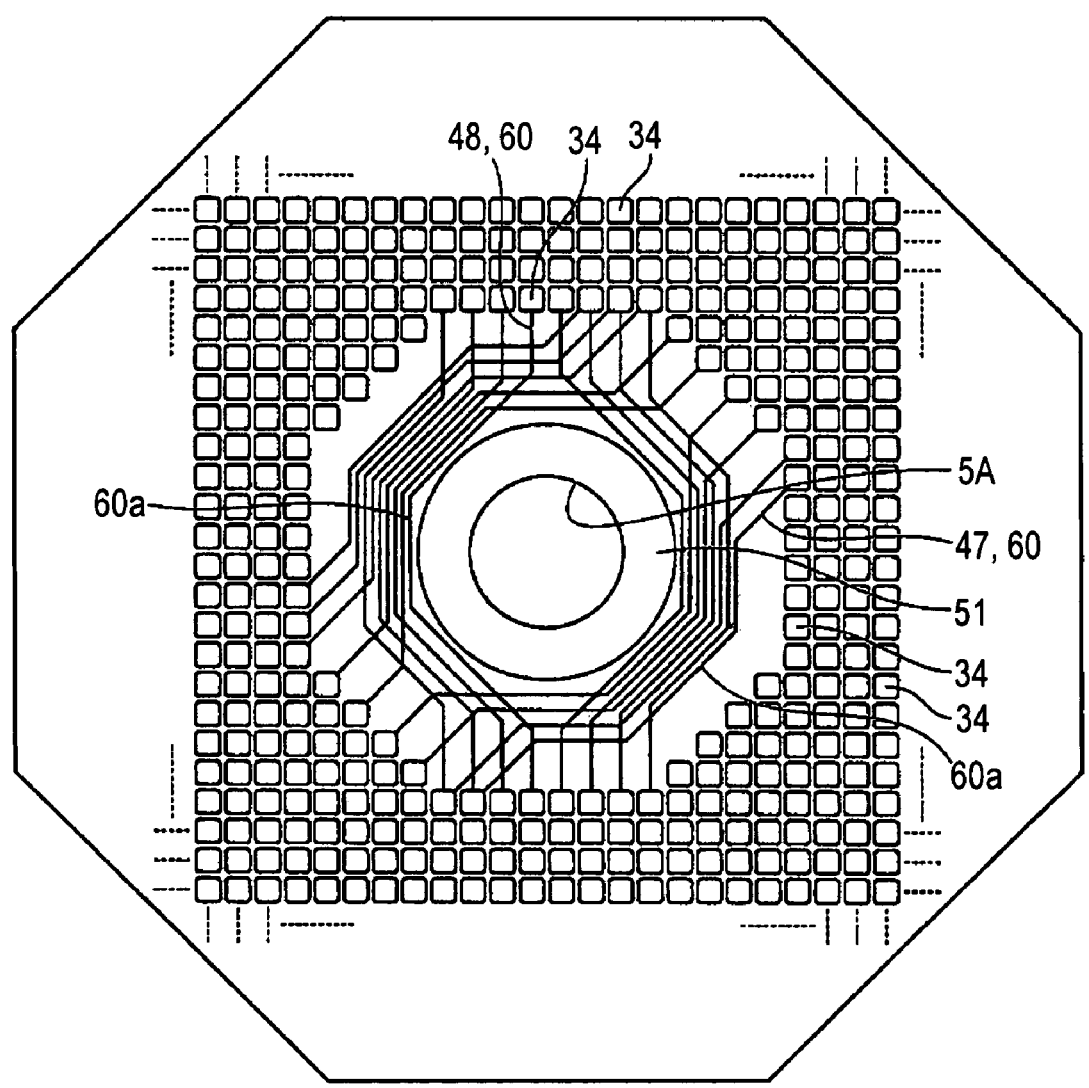
FIG. 11 is a schematic plan view of the region surrounding the through-hole in the first embodiment of the invention.

Although the display panel 5 described in this embodiment has the circular display region shown in FIG. 1, the invention is not limited to this example, and the display panel 5 may have, for example, an octagonal shape as shown in FIG. 11. If the display panel 5 has such an octagonal shape, for example, the scanning lines 47 and the data lines 48 do not have to be arranged orthogonally, but either the scanning lines 47 or the data lines 48 can be inclined (at an angle of, for example, 45°). Of these wiring lines 60 (including the scanning lines 47 and the data lines 48), the bypass line portions 60a are provided in the wiring lines 60 positioned so as to overlap the avoided portion 52 in design. The wiring lines 60 thus extend around and bypass the avoided portion 52.

Although not shown in FIG. 11, the surrounding pixel electrodes 35a (35b) are formed over the bypass line portions 60a, as shown in FIGS. 4 and 8. These surrounding pixel electrodes 35a (35b) are connected to the pixel-driving circuits 34 disposed around and closest to the through-hole 5A and extend toward the through-hole 5A, as shown in FIG. 8. Alternatively, the single surrounding pixel electrode 35c, as shown in FIG. 10, may be formed over the bypass line portions 60a.

The display region around the avoided portion 52, including the through-hole 5A, can be widened as in the case of the circular display region even if the display region of the display panel 5 has a noncircular shape, for example, a polygonal shape such as an octagonal shape, and the wiring lines 60 positioned so as to overlap the avoided portion 52 in design intersect at an inclined angle, as described above.

Figure 12A:
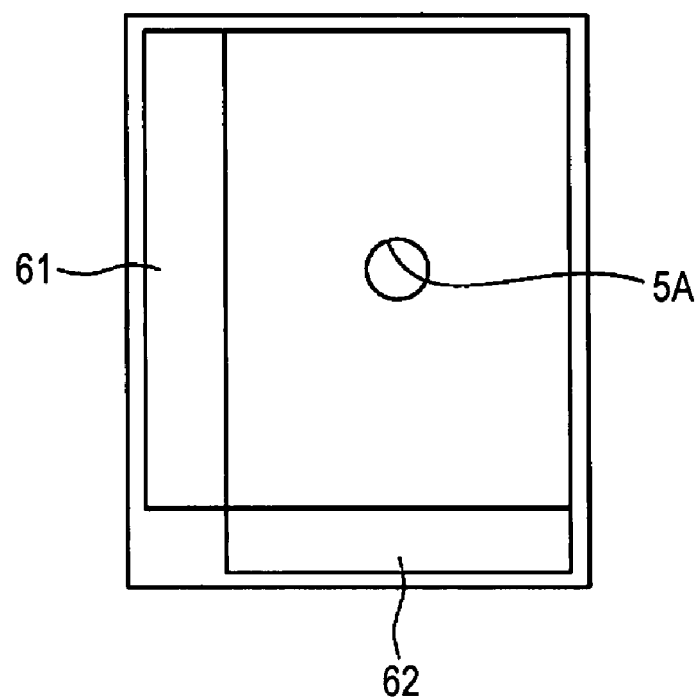
FIGS. 12A and 12B are plan views showing examples of the shape of the display region of the display panel according to the first embodiment of the invention.
Figure 12B:
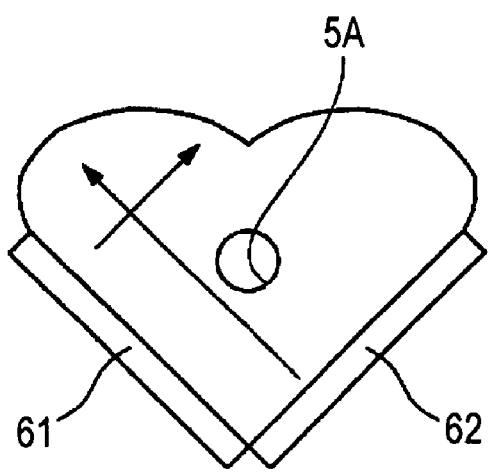

The display region around the avoided portion 52, including the through-hole 5A, can similarly be widened even if the display panel 5 has a shape other than the octagonal shape, such as a rectangular shape as shown in FIG. 12A or a heart shape as shown in FIG. 12B, as an example of a special shape.

Gate drivers 61 and source drivers 62 are shown in FIGS. 12A and 12B.

Figure 13A:
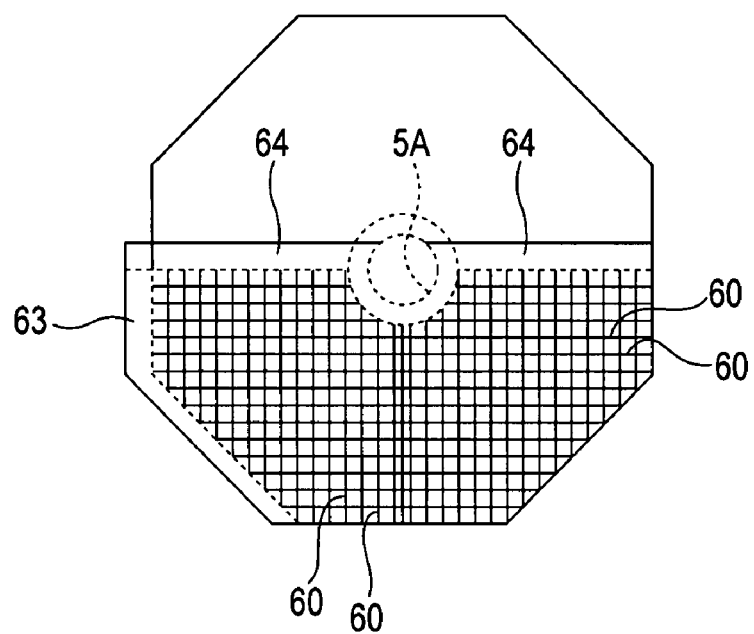
FIGS. 13A and 13B are plan views showing relationships between display regions and through-holes in the first embodiment of the invention.
Figure 13B:
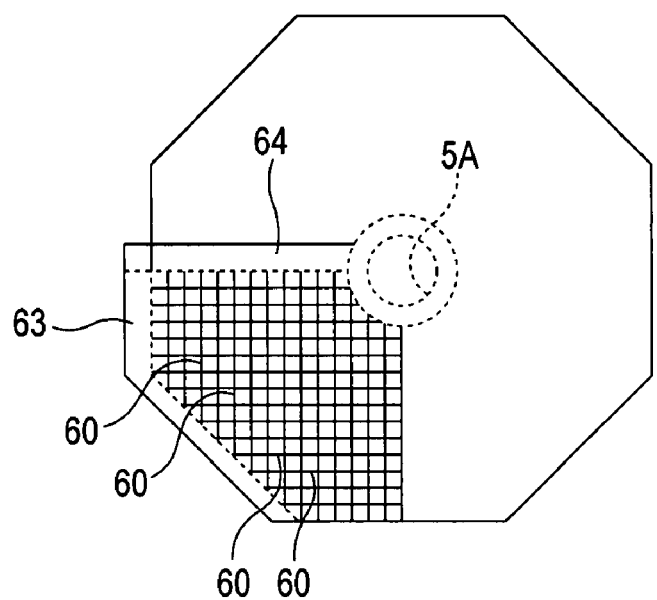

Although the entire avoided portion 52, including the through-hole 5A, is formed in the display region of the display panel 5 in this embodiment, the invention is not limited thereto, and only part of the avoided portion 52 may be formed in the display region of the display panel 5. Specifically, if the display panel 5 has a regular octagonal shape with the through-hole 5A formed in its center, as shown in FIG. 13A, the display region where the wiring lines 60 are arranged may be defined such that half the area of the through-hole 5A is disposed in the display region while the other half is disposed outside the display region. Alternatively, as shown in FIG. 13B, the display region where the wiring lines 60 are arranged may be defined such that a quarter of the area of the through-hole 5A is disposed in the display region while the rest is disposed outside the display region. Gate drivers 63 and data drivers 64 are shown in FIGS. 13A and 13B.

The active-matrix circuit board according to this embodiment can thus be applied even if the display panel 5 has a relatively narrow display region. In particular, the active-matrix circuit board can readily be applied to a display panel having a narrow display region designed for suppressed power consumption and increased battery life.

Second Embodiment

Next, a second embodiment of the invention will be described.

Figure 14:
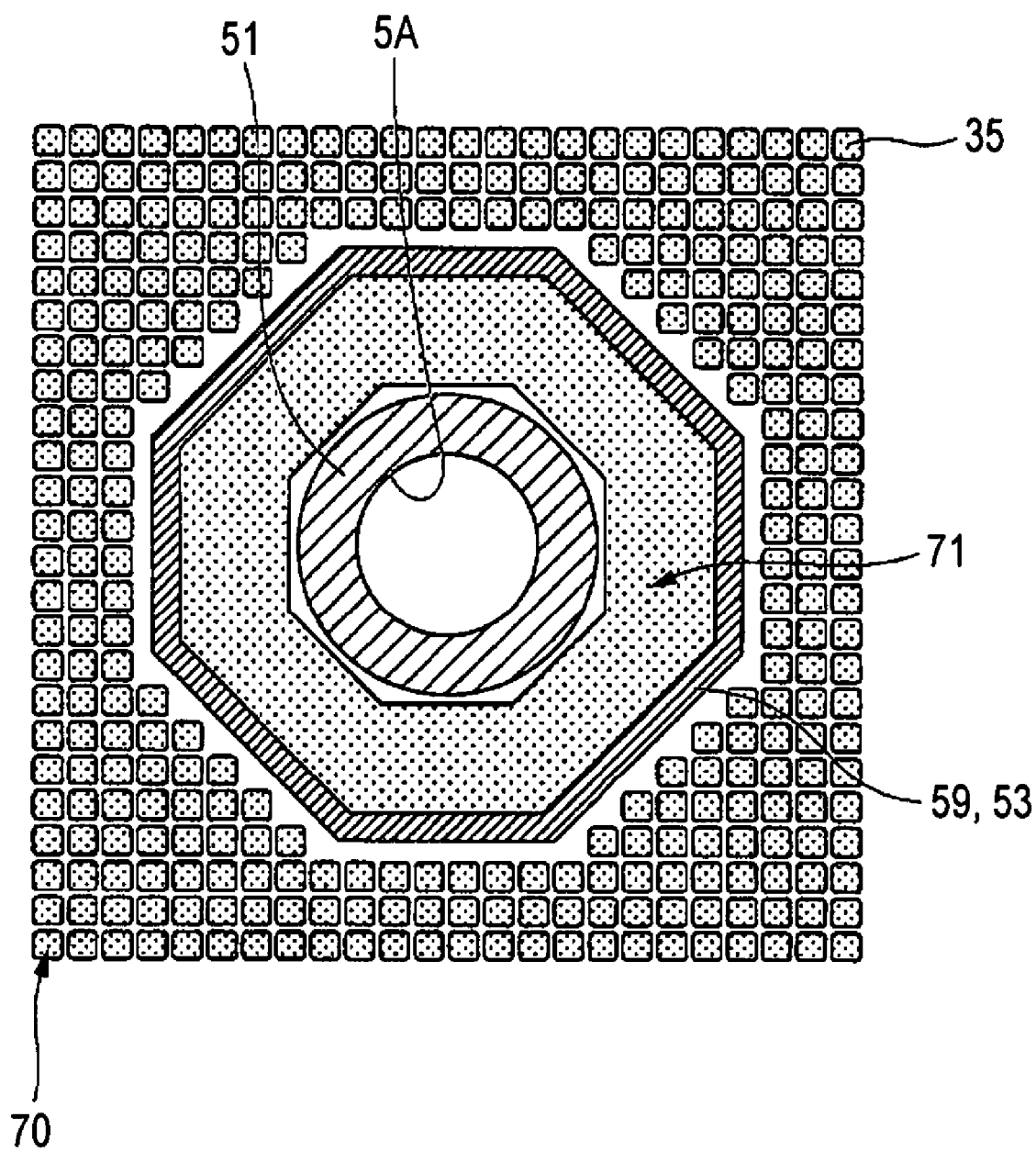
FIG. 14 is a plan view showing the structure of a display according to a second embodiment of the invention.

FIG. 14 is a plan view showing another schematic structure of the display panel 5. This display panel 5 is a display according to the second embodiment of the invention. In FIG. 14, the pixel electrodes 35 are arranged in a two-dimensional matrix in a display region 70. The pixel electrodes 35 are not arranged in a region 71 surrounding the through-hole 5A. Wring lines for transmitting a variety of signals, for example, are disposed in the region 71 surrounding the through-hole 5A.

Figure 15:
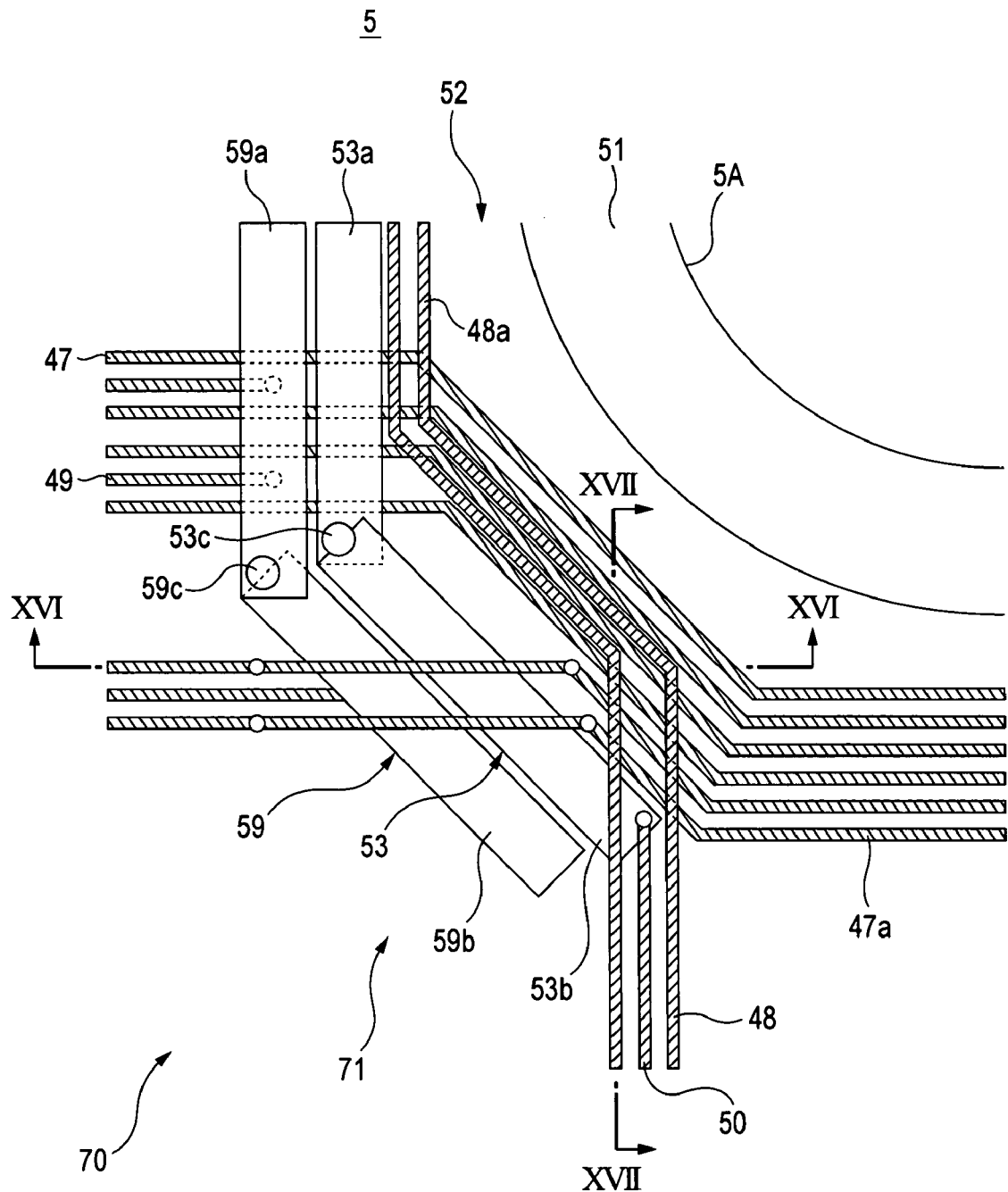
FIG. 15 is a plan view showing part of the structure of the display according to the second embodiment of the invention.

FIG. 15 is a plan view showing the structure of the region 71 surrounding the through-hole 5A in the display panel 5.

In the display region 70, as shown in FIG. 15, the scanning lines 47 are arranged in the vertical direction of the two-dimensional matrix so as to extend in the horizontal direction. Similarly, the low-voltage power lines 49 are arranged in the vertical direction of the two-dimensional matrix so as to extend in the horizontal direction. In the display region 70, the low-voltage power lines 49 and the scanning lines 47 are alternately arranged in the vertical direction of the two-dimensional matrix (in the direction in which the low-voltage power lines 49 and the scanning lines 47 are arranged).

In the display region 70, additionally, the data lines 48 are arranged in the horizontal direction of the two-dimensional matrix so as to extend in the vertical direction. Similarly, the high-voltage power lines 50 are arranged in the horizontal direction of the two-dimensional matrix so as to extend in the vertical direction. In the display region 70, the high-voltage power lines 50 and the data lines 48 are alternately arranged in the horizontal direction of the two-dimensional matrix (in the direction in which the high-voltage power lines 50 and the data lines 48 are arranged).

The region 71 surrounding the through-hole 5A is a region where wiring lines positioned so as to overlap the through-hole 5A in design are disposed, that is, a region where wiring lines are disposed which would be disposed so as to overlap the region where the through-hole 5A is formed if the through-hole 5A were not formed. In the surrounding region 71, the scanning lines 47 and the data lines 48 include bypass line portions 47a and 48a, respectively, thus extending around and bypassing the through-hole 5A.

The sealing portion 51 is formed in the region 71 surrounding the through-hole 5A to seal the circumference of the through-hole 5A. The scanning lines 47 and the data lines 48 cannot extend through the sealing portion 51. In this embodiment, therefore, the avoided portion 52 includes the through-hole 5A and the sealing portion 51.

Of the scanning lines 47 and the data lines 48, the bypass line portions 47a and 48a are provided not only in those positioned so as to overlap the through-hole 5A in design, but also in those positioned so as to overlap the sealing portion 51 in design, extending around and bypassing the sealing portion 51.

The bypass line portions 47a must also be provided in the scanning lines 47 positioned near the scanning lines 47 including the bypass line portions 47a to extend therearound. The bypass line portions 48a must also be provided in the data lines 48 positioned near the data lines 48 including the bypass line portions 48a to extend therearound. In this embodiment, the bypass line portions 47a and 48a are similarly provided in such scanning lines 47 and data lines 48, respectively. In this embodiment, the avoided portion 52 not only includes the through-hole 5A and the sealing portion 51, but also includes the bypass line portions 47a and 48a positioned near the through-hole 5A and the sealing portion 51.

In addition, low-voltage connection portions 59 connected to the low-voltage power lines 49 and high-voltage connection portions 53 connected to the high-voltage power lines 50 are provided in the region 71 surrounding the through-hole 5A. The low-voltage connection portions 59 and the high-voltage connection portions 53 are formed of a conductive material such as a metal or ITO and have an annular shape, such as a regular octagonal annular shape, surrounding the avoided portion 52 in plan view. The low-voltage connection portions 59 and the high-voltage connection portions 53 are disposed outside the bypass line portions 47a and 48a in the region 71 surrounding the through-hole 5A, that is, around the circumference of the region 71 surrounding the through-hole 5A. In FIG. 15, the low-voltage connection portions 59 are disposed outside the high-voltage connection portions 53. The low-voltage connection portions 59 integrate the low-voltage power lines 49 into a single line portion extending around the avoided portion 52. The high-voltage connection portions 53 integrate the high-voltage power lines 50 into a single line portion extending around the avoided portion 52.

Figure 16:
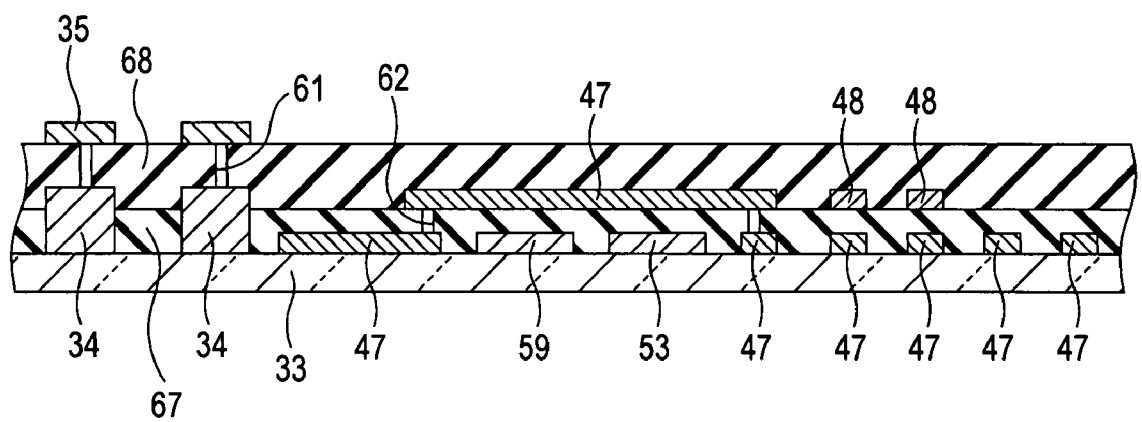
FIG. 16 is a sectional view of a first substrate of the display according to the second embodiment of the invention.
Figure 17:
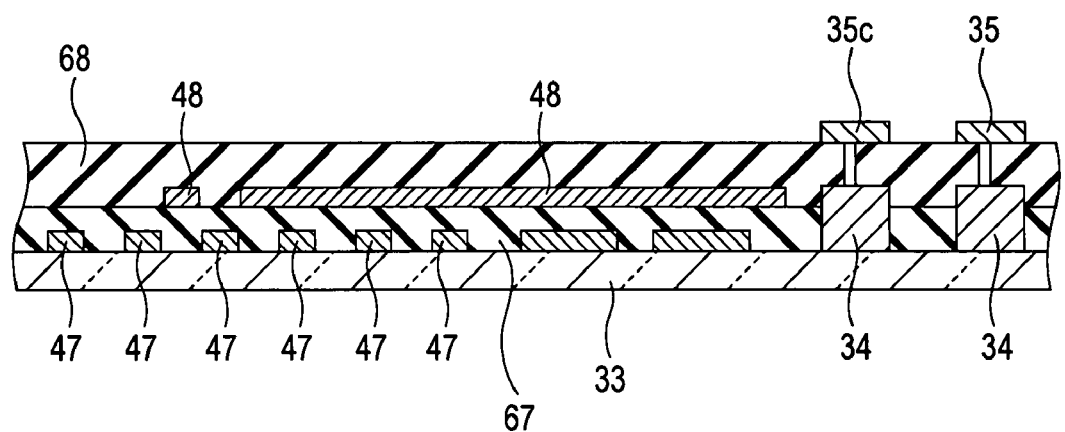
FIG. 17 is a sectional view of the first substrate of the display according to the second embodiment of the invention.

FIG. 16 is a sectional view taken along line XVI-XVI of FIG. 15. FIG. 17 is a sectional view taken along line XVII-XVII of FIG. 15.

In FIGS. 16 and 17, the pixel-driving circuits 34 are disposed on the glass substrate 33. The pixel electrodes 35 are disposed in a layer upper than the pixel-driving circuits 34 and are arranged in a two-dimensional matrix so as to overlap the pixel-driving circuits 34 in plan view. The pixel electrodes 35 and the pixel-driving circuits 34 are electrically connected via contact holes 61.

In addition, the scanning lines 47, the low-voltage connection portions 59, and the high-voltage connection portions 53 are disposed on the glass substrate 33. An insulating layer 67 is disposed over the scanning lines 47, the low-voltage connection portions 59, and the high-voltage connection portions 53. The scanning lines 47 extend over the insulating layer 67 via, for example, contact holes 62 at positions where the scanning lines 47 intersect the low-voltage connection portions 59 and the high-voltage connection portions 53 in plan view. The data lines 48 are disposed on the insulating layer 67. Another insulating layer 68 is disposed over the data lines 48. The pixel electrodes 35 are disposed on the insulating layer 68.

In regions where the scanning lines 47 or the data lines 48 are disposed on the glass substrate 33, the low-voltage connection portions 59 and the high-voltage connection portions 53 are disposed in a layer on the insulating layer 67 so as to extend around the scanning lines 47 or the data lines 48 (for example, a low-voltage connection portion 59*a* and a high-voltage connection portion 53*a* extending in the vertical direction of FIG. 15). In regions where the scanning lines 47 or the data lines 48 are disposed on the insulating layer 67, the low-voltage connection portions 59 and the high-voltage connection portions 53 are disposed in a layer on the glass substrate 33 so as to extend around the scanning lines 47 or the data lines 48 (for example, a low-voltage connection portion 59*b* and a high-voltage connection portion 53*b* extending at an angle of 45° with respect to the vertical direction of FIG. 15). The low-voltage connection portion 59*a* on the insulating layer 67 is electrically connected to the low-voltage connection portion 59*b* on the glass substrate 33 via a contact plug 59*c*. The high-voltage connection portion 53*a* on the insulating layer 67 is electrically connected to the high-voltage connection portion 53*b* on the glass substrate 33 via a contact plug 53*c*.

Figure 18A:
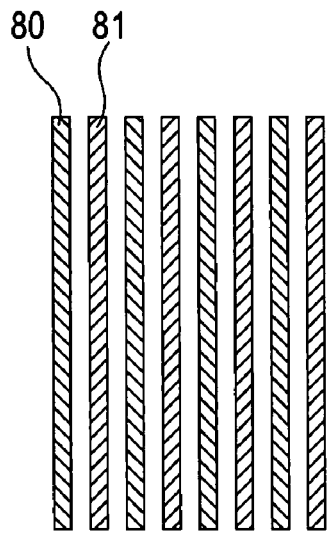
FIGS. 18A and 18B are diagrams illustrating an effect provided by integrating power lines in the second embodiment of the invention.

Referring to FIG. 18A, generally, wiring lines 80 for supplying power and wiring lines 81 for supplying signals (scanning lines and data lines) are alternately arranged to drive pixels arranged in a two-dimensional matrix. These wiring lines 80 and 81 are provided for individual pixel lines. The wiring lines 80 and 81 are separated from each other in the pixel-line direction because they are arranged at intervals so that no short-circuit occurs therebetween. Therefore, the area of the display region is undesirably decreased by the length of the intervals.

Figure 18B:
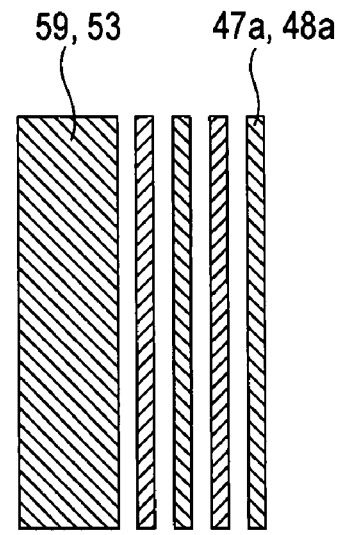

In this embodiment, as shown in FIG. 18B, the low-voltage connection portions 59 and the high-voltage connection portions 53 are connected to and integrate the low-voltage power lines 49 and the high-voltage power lines 50, respectively, connected to the pixel-driving circuits 34 for driving the pixel electrodes 35 in the region 71 surrounding the through-hole 5A. The integration of the power lines 49 and 50 can correspondingly reduce the space where they are arranged. The low-voltage connection portions 59 and the high-voltage connection portions 53 can bypass the avoided portion 52 while reducing the space for the low-voltage power lines 49 and the high-voltage power lines 50, thus providing a correspondingly increased display area.

Third Embodiment

Figure 19:
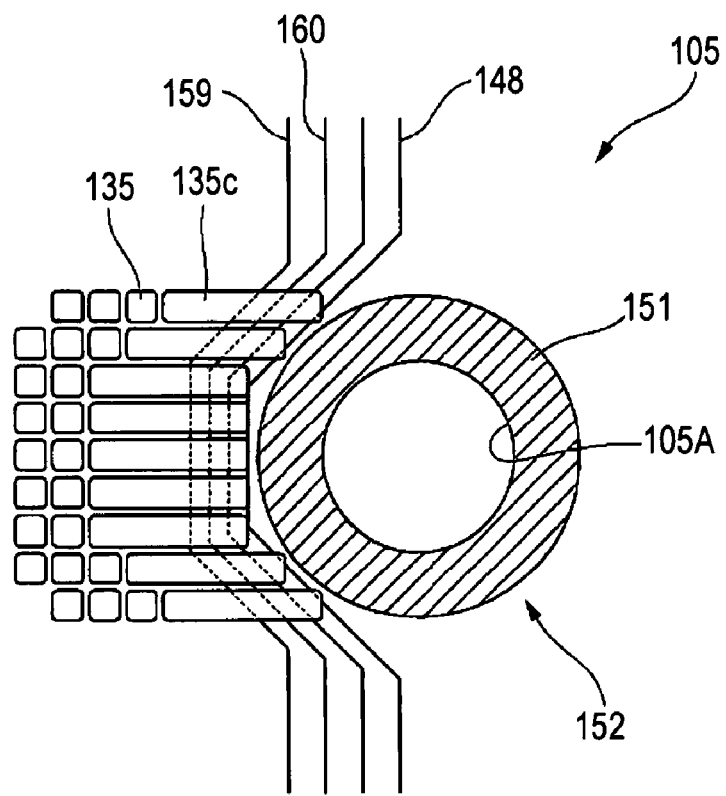
FIG. 19 is a plan view showing the structure of a display according to a third embodiment of the invention.

Next, a third embodiment of the invention will be described. FIG. 19 is a plan view showing the structure of a display panel 105. This display panel 105 is a display according to the third embodiment of the invention.

The display panel 105 according to this embodiment has substantially the same structure as the display panel 5 according to the second embodiment. This embodiment differs from the second embodiment in that the display panel 105 includes pixel electrodes 135 arranged in a two-dimensional matrix and pixel electrodes 135*c* extending from outside an avoided portion 152 into the avoided portion 152.

In this structure, the pixel electrodes 135*c* can be disposed in the avoided portion 152. The third embodiment can therefore provide the same advantages as the second embodiment and can also provide the advantage of widening the display region.

Fourth Embodiment

Figure 20:
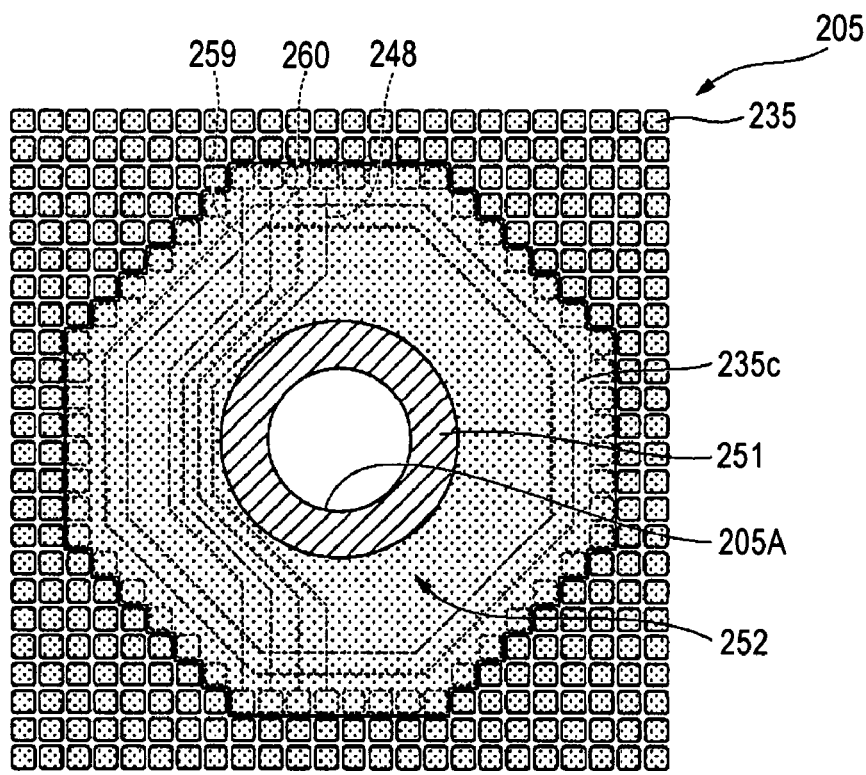
FIG. 20 is a plan view showing the structure of a display according to a fourth embodiment of the invention.

Next, a fourth embodiment of the invention will be described. FIG. 20 is a plan view showing the structure of a display panel 205. This display panel 205 is a display according to the fourth embodiment of the invention.

The display panel 205 according to this embodiment has substantially the same structure as the display panel 5 according to the second embodiment. This embodiment differs from the second embodiment in that the display panel 205 includes pixel electrodes 235 arranged in a two-dimensional matrix and an annular pixel electrode 235*c* overlapping an avoided portion 252.

In this structure, as in the third embodiment, the pixel electrode 235*c* can be disposed in the avoided portion 252. The third embodiment can therefore provide the same advantages as the second embodiment and can also provide the advantage of widening the display region.

Fifth Embodiment

Figure 21:
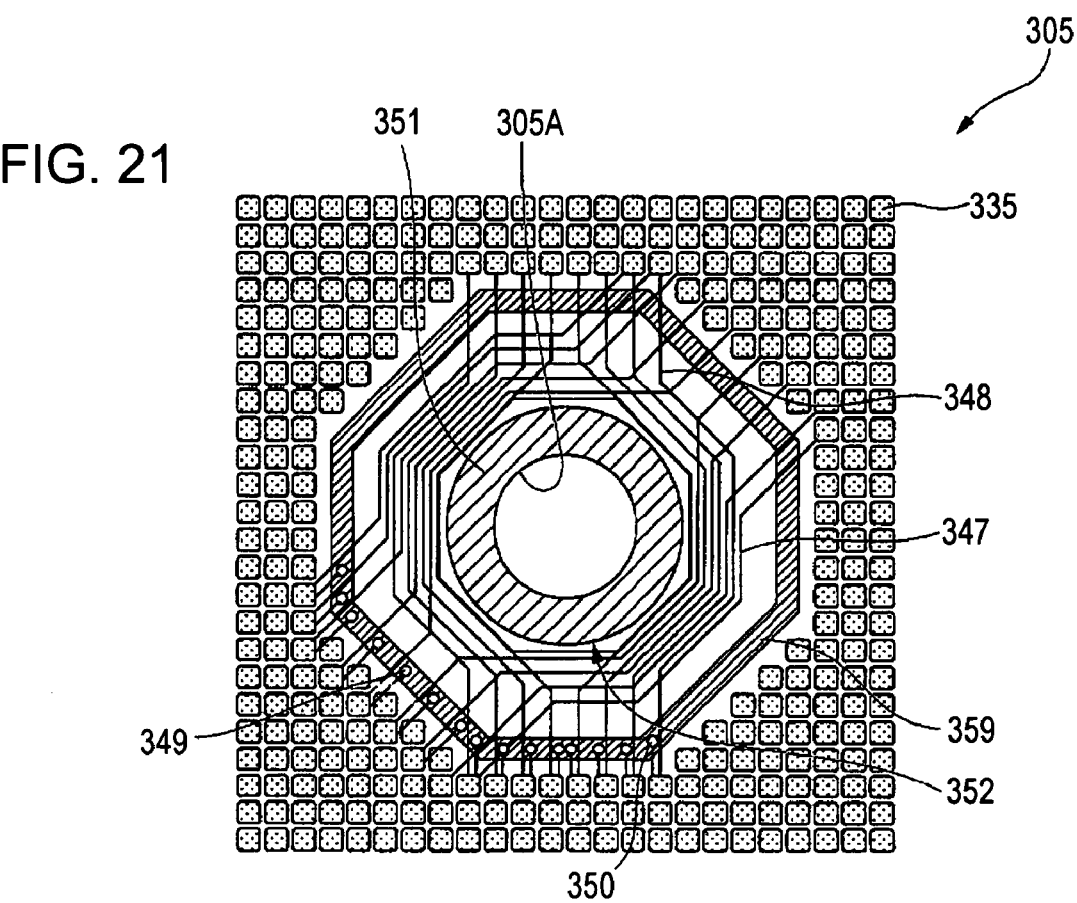
FIG. 21 is a plan view showing the structure of a display according to a fifth embodiment of the invention.

Next, a fifth embodiment of the invention will be described. FIG. 21 is a plan view showing the structure of a display panel 305. This display panel 305 is a display according to the fifth embodiment of the invention.

In the display panel 305 according to this embodiment, scanning lines 347 are not arranged orthogonally to data lines 348 but are inclined (at an angle of, for example, 45°). Low-voltage power lines 349 are disposed between the scanning lines 347 in a region where pixel electrodes 335 are arranged in a two-dimensional matrix. The scanning lines 347 and the low-voltage power lines 349 are alternately arranged. In this region, similarly, high-voltage power lines 350 are disposed between the data lines 348. The data lines 348 and the high-voltage power lines 350 are alternately arranged. Connection portions 359 are provided around a through-hole 305A and a sealing portion 351 (avoided portion 352). The connection portions 359 are connected to and integrate the low-voltage power lines 349 and the high-voltage power lines 350.

Although the scanning lines 347 are inclined in the above structure, the data lines 348 may be inclined. In addition, although the low-voltage power lines 349 and the high-voltage power lines 350 are connected to the common connection portions 359 in the above structure, they may be connected to different connection portions.

Thus, the connection portions 359 can be connected to and integrate the low-voltage power lines 349 and the high-voltage power lines 350 even though the arrangement of the scanning lines 347 and the data lines 348 differs from that of the second embodiment. The connection portions 359 can bypass the avoided portion 352 while reducing the space for the low-voltage power lines 349 and the high-voltage power lines 350. The fifth embodiment can therefore provide the same advantages as the second embodiment.

Sixth Embodiment

Next, a sixth embodiment of the invention will be described.

In this embodiment, only part of an avoided portion is formed in a display region of a display.

Figure 22:
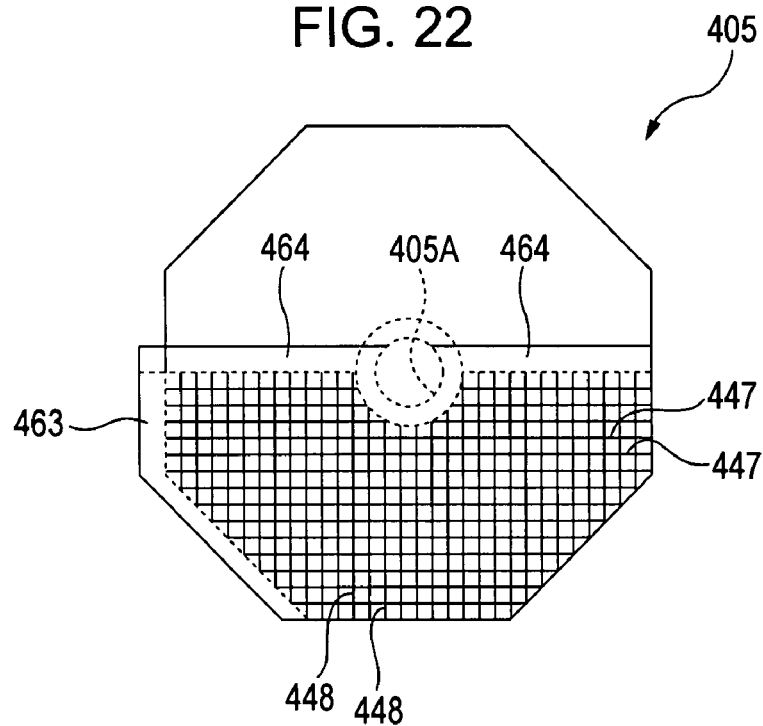
FIG. 22 is a plan view showing the structure of a display according to a sixth embodiment of the invention.

Referring to FIG. 22, specifically, a display panel 405 has a regular octagonal planar shape with a through-hole 405A formed in its center. In this example, a display region where scanning lines 447 and data lines 448 are arranged may be defined such that half the area of the through-hole 405A is disposed in the display region while the other half is disposed outside the display region. A gate driver 463 and data drivers 464 are shown in FIG. 22.

Figure 23:
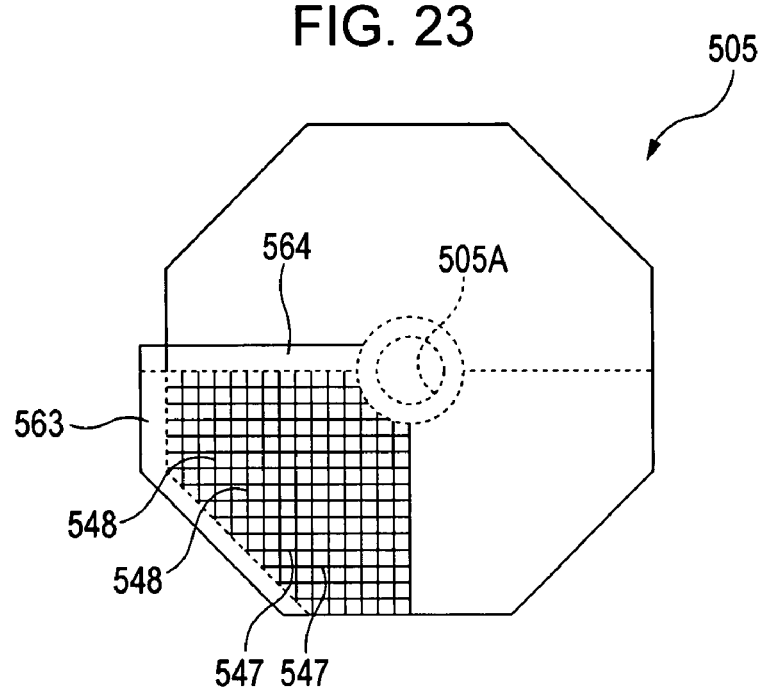
FIG. 23 is a plan view showing the structure of another display according to the sixth embodiment of the invention.

FIG. 23 shows another example of a display region where part of an avoided portion is formed. In FIG. 23, a display panel 505 has a regular octagonal planar shape with a through-hole 505A formed in its center. In this example, a display region where scanning lines 547 and data lines 548 are arranged may be defined such that a quarter of the area of the through-hole 505A is disposed in the display region while the rest is disposed outside the display region. A gate driver 563 and a data driver 564 are shown in FIG. 23.

The active-matrix circuit board according to this embodiment can thus be applied to a display panel in which part of an avoided portion is formed in a display region even if the display region is relatively narrow. In particular, the active-matrix circuit board can readily be applied to a display panel having a narrow display region designed for suppressed power consumption and increased battery life.

The technical scope of the invention is not limited to the above embodiments, and any modification is permitted without departing from the spirit of the invention.

Figure 24:
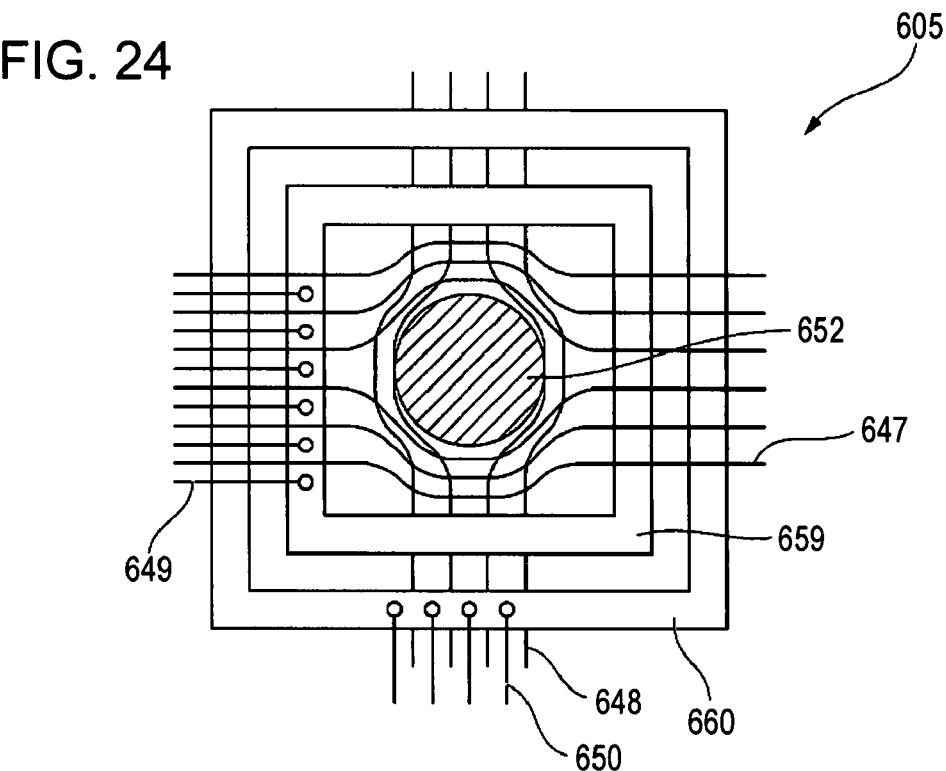
FIG. 24 is a plan view showing the structure of a display according to another embodiment of the invention.

Although the low-voltage and high-voltage connection portions in the above embodiments have an octagonal annular planar shape, the shape of the connection portions is not limited thereto. Referring to FIG. 24, for example, low-voltage connection portions 659 and high-voltage connection portions 660 may be formed in a square annular shape.

In addition to a display having an octagonal planar shape as described in the above embodiments, a display having a rectangular planar shape as shown in FIG. 12A may be provided. Even if the display has a rectangular shape, its display region can be widened around an avoided portion including a through-hole. The rectangular shape can also eliminate the need to form contact plugs because low-voltage power lines and high-voltage power lines do not have to be electrically connected between different layers through contact plugs to extend around scanning lines and data lines.

As an example of a special shape, a display having a heart planar shape as shown in FIG. 12B may be provided. The display region of the display can similarly be widened around an avoided portion including a through-hole.

Seventh Embodiment

Next, a seventh embodiment of the invention will be described.

Figure 25:
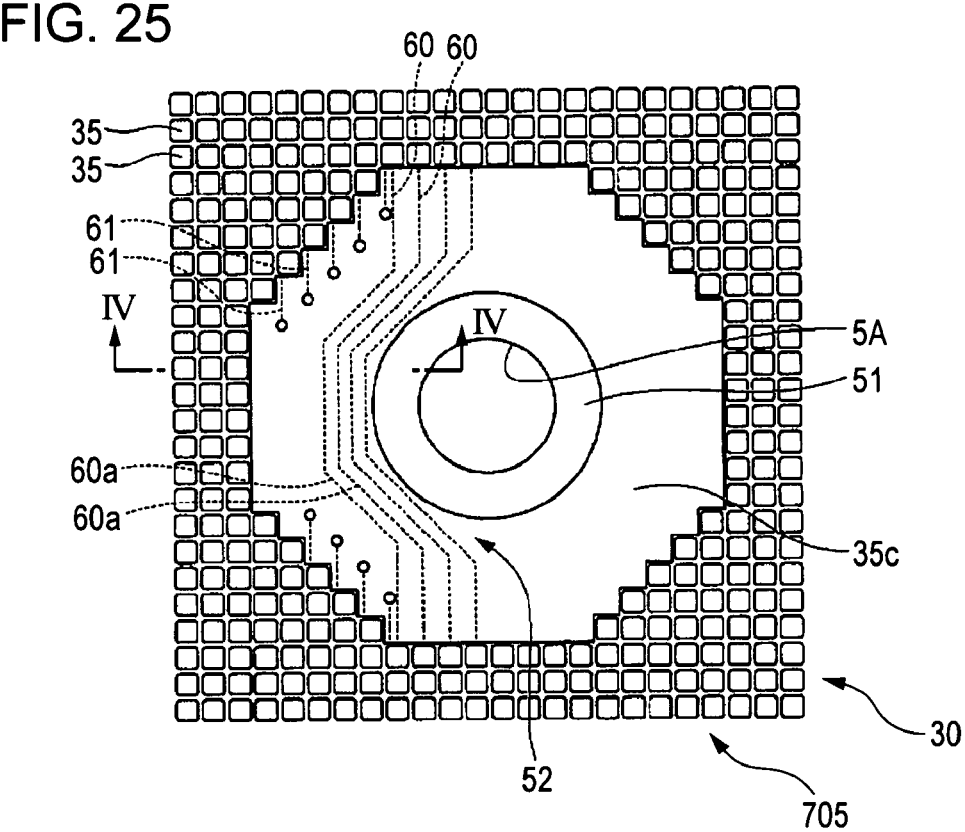
FIG. 25 is a plan view showing the structure of a display panel according to a seventh embodiment of the invention.

FIG. 25 is a plan view showing the structure of a region surrounding a through-hole 5A on a first substrate 30 of a display panel 705. This display panel 705 is a display according to the seventh embodiment of the invention. A sectional view taken along line IV-IV of FIG. 25 is the same as FIG. 4 of the first embodiment.

The pixel-driving circuits 34 are disposed on the glass substrate 33 to supply electrical signals to the pixel electrodes 35. The pixel electrodes 35 are disposed in a layer upper than the pixel-driving circuits 34 and are arranged in a two-dimensional matrix so as to overlap the pixel-driving circuits 34 in plan view. An annular pixel electrode 35c is disposed in the region surrounding the through-hole 5A so as to surround the through-hole 5A. The pixel electrodes 35 are formed of a conductive material such as ITO or a metal.

Pixel lines 60 are disposed in the same layer as the pixel-driving circuits 34. The pixel lines 60 include the scanning lines 47 and the data lines 48, which are connected to the pixel-driving circuits 34 (transistors 41) through, for example, switching elements (not shown). Power lines 61 are disposed in the same layer as the pixel lines 60 and are arranged in parallel with the pixel lines 60. The power lines 61 include the low-voltage power lines 49 and the high-voltage power lines 50, which are connected to the latch circuits 46.

The pixel lines 60 and the power lines 61 are linearly arranged in a matrix in a display region other than the region surrounding the through-hole 5A. The pixel lines 60 include portions positioned around the through-hole 5A so as to overlap the through-hole 5A in design, that is, portions that would be disposed so as to overlap the region where the through-hole 5A is formed if the through-hole 5A were not formed. These portions include the bypass line portions 60a extending around and bypassing the through-hole 5A.

The sealing portion 51 is formed around the through-hole 5A to seal the circumference of the through-hole 5A. The pixel lines 60 cannot be formed in the sealing portion 51. In this embodiment, therefore, the avoided portion 52 includes the through-hole 5A and the sealing portion 51. Of the pixel lines 60, the bypass line portions 60a are provided not only in the pixel lines 60 positioned so as to overlap the through-hole 5A in design, but also in the pixel lines 60 positioned so as to overlap the sealing portion 51 in design, extending around and bypassing the sealing portion 51.

In FIG. 25, the bypass line portions 60a must also be provided in the pixel lines 60 positioned near the pixel lines 60 including the bypass line portions 60a to extend therearound. In this embodiment, the bypass line portions 60a are similarly provided in such pixel lines 60. In this embodiment, the avoided portion 52 not only includes the through-hole 5A and the sealing portion 51, but also includes the bypass line portions 60a positioned near the through-hole 5A and the sealing portion 51.

Figure 26:
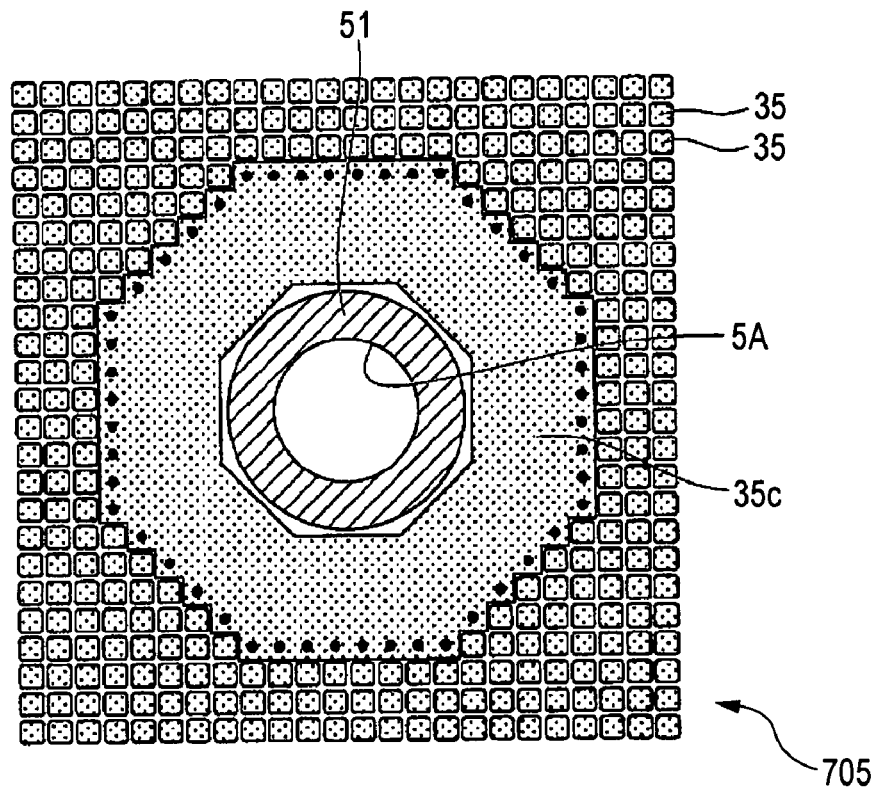
FIG. 26 is a schematic plan view of a region surrounding a through-hole in the seventh embodiment of the invention.

The power lines 61 are connected to the pixel electrode 35c via, for example, contact holes in the region surrounding the through-hole 5A. The pixel electrode 35c allows the power lines 61 to extend around and bypass the avoided portion 52, including the through-hole 5A, the sealing portion 51, and the bypass line portions 60a. Referring to FIG. 26, the power lines 61 are connected to the pixel electrode 35c in a peripheral region of the pixel electrode 35c (for example, at the positions indicated by the black dots in FIG. 26).

According to this embodiment, the pixel electrode 35c, which is disposed in the layer different from (upper than) the layer in which the wiring lines are disposed, connect some of the wiring lines (power lines 61) in the region surrounding the avoided portion 52. These wiring lines can bypass the avoided portion 52 through the pixel electrode 35*c*. The bypassing through the pixel electrode 35*c* can correspondingly reduce the number of wiring lines bypassing the avoided portion 52 to minimize the area of a region where the wiring lines bypass the avoided portion 52, thus providing a correspondingly increased display area.

Eighth Embodiment

Next, an eighth embodiment of the invention will be described.

Figure 27:
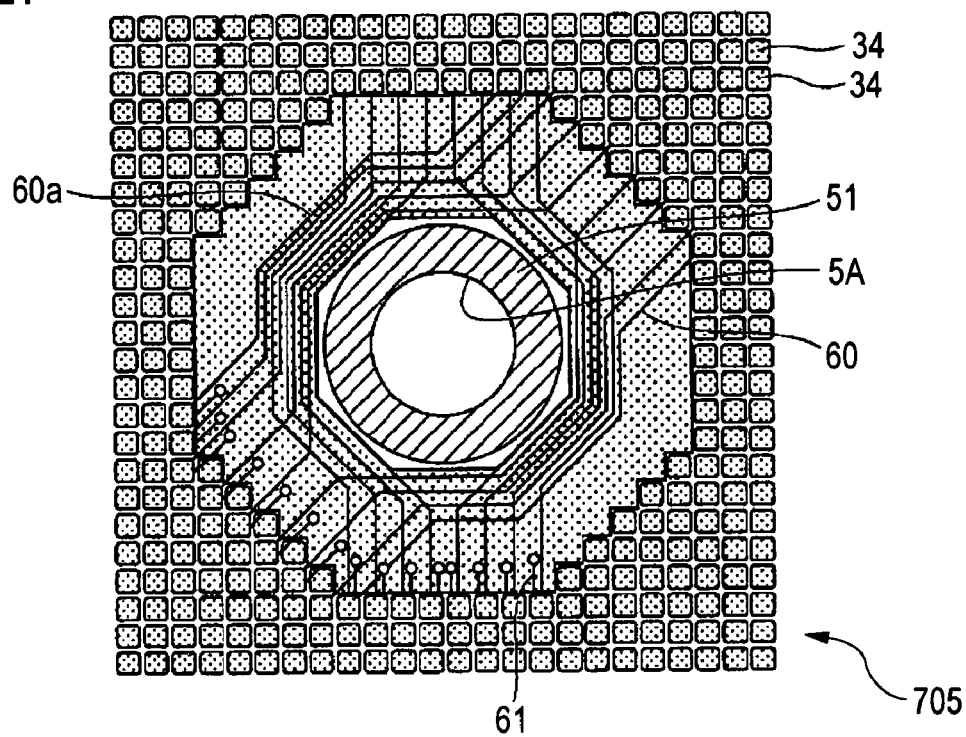
FIG. 27 is a schematic plan view of a region surrounding a through-hole in an eighth embodiment of the invention.

While the display panel 705 described in the seventh embodiment has a circular display region, an octagonal display region is provided in this embodiment, as shown in FIG. 27. If the display region has such an octagonal shape, for example, the scanning lines 47 and the data lines 48 do not have to be arranged orthogonally, but either the scanning lines 47 or the data lines 48 can be inclined (at an angle of, for example, 45°). Of the pixel lines 60 (including the scanning lines 47 and the data lines 48), the bypass line portions 60*a* are provided in the pixel lines 60 positioned so as to overlap the avoided portion 52 in design, extending around and bypass the avoided portion 52.

As shown in FIG. 25, the pixel electrode 35*c* is formed around the through-hole 5A over the bypass line portions 60*a*. The power lines 61 are connected to the pixel electrode 35*c* via, for example, contact holes. The power lines 61 are connected to the pixel electrode 35*c* at substantially the same positions as shown in FIG. 26.

The display region around the avoided portion 52, including the through-hole 5A, can similarly be widened even if the display panel 705 has a shape other than the octagonal shape, such as a rectangular shape as shown in FIG. 12A or a heart shape as shown in FIG. 12B, as an example of a special shape.

Thus, the display region around the avoided portion 52, including the through-hole 5A, can be widened as in the case of the circular display region even if the display region of the display panel 705 has a noncircular shape, for example, a polygonal shape such as an octagonal shape, and the pixel lines 60 positioned so as to overlap the avoided portion 52 in design intersect at an inclined angle, as described above. In addition, the display region around the avoided portion 52, including the through-hole 5A, can be widened as in the case of the circular display region even if the display region has another shape such as a rectangular shape or a heart shape.

Ninth Embodiment

Figure 28:
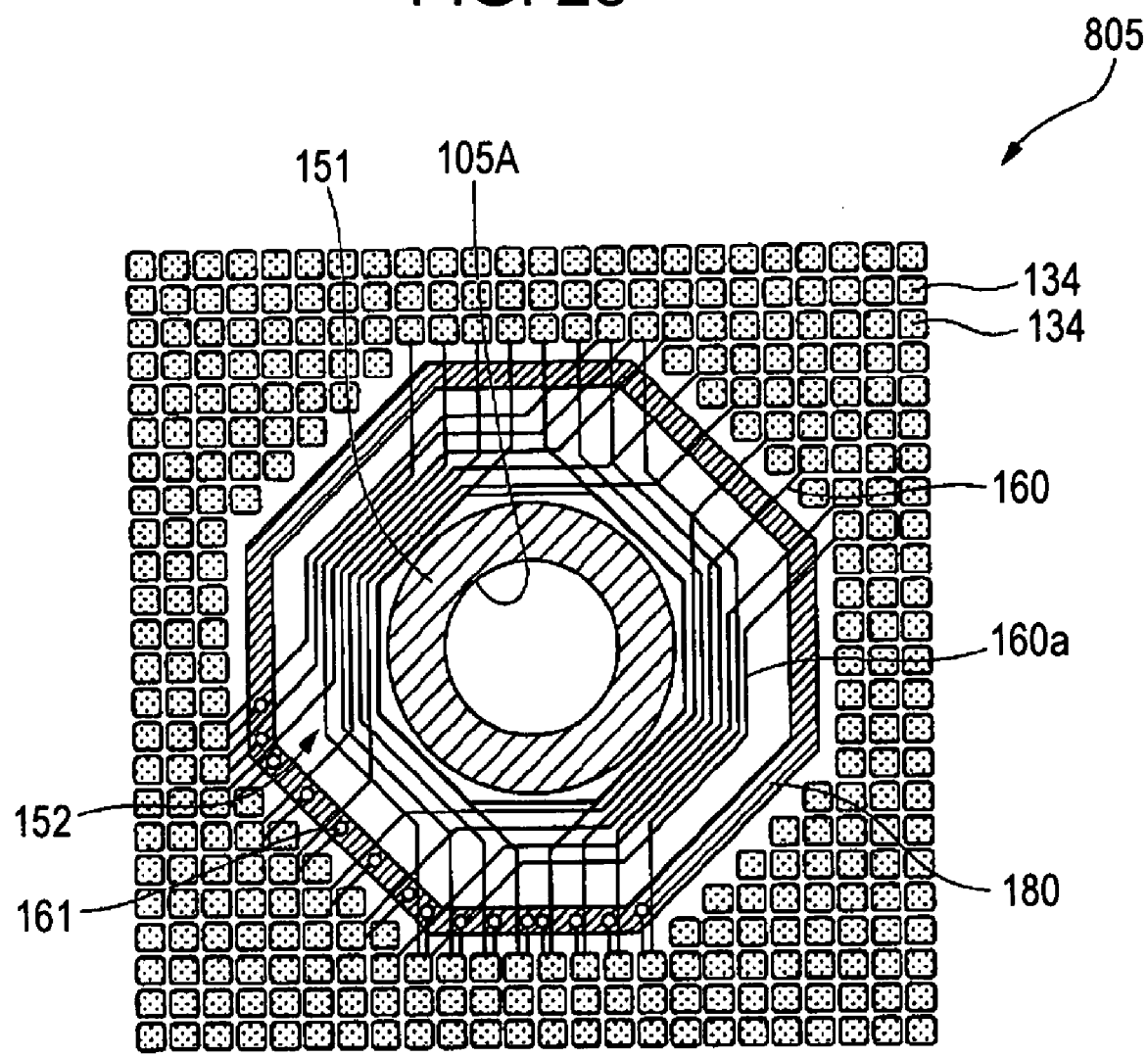
FIG. 28 is a schematic plan view showing the structure of a display panel according to a ninth embodiment of the invention.

Next, a ninth embodiment of the invention will be described. FIG. 28 is a plan view showing the structure of a display panel 805 according to this embodiment and corresponds to FIG. 27 of the eighth embodiment.

In this embodiment, an annular electrode 180 is provided around a through-hole 105A and a sealing portion 151. Power lines 161 are connected to the annular electrode 180. This annular electrode 180 is formed in a layer different from a layer in which the power lines 161 and pixel lines 160 are disposed and is connected to the power lines 161 via contact holes. The annular electrode 180 is formed of, for example, a conductive material such as a metal. Because the power lines 161 are connected to the annular electrode 180, the power lines 161 bypass an avoided portion 152 through the annular electrode 180. In this embodiment, the annular electrode 180 is used as a ground electrode. If the annular electrode 180 is used as a ground electrode, some wiring lines function as ground lines, thus reinforcing a ground pattern.

The technical scope of the invention is not limited to the above embodiments, and any modification is permitted without departing from the spirit of the invention.

Figure 29A:
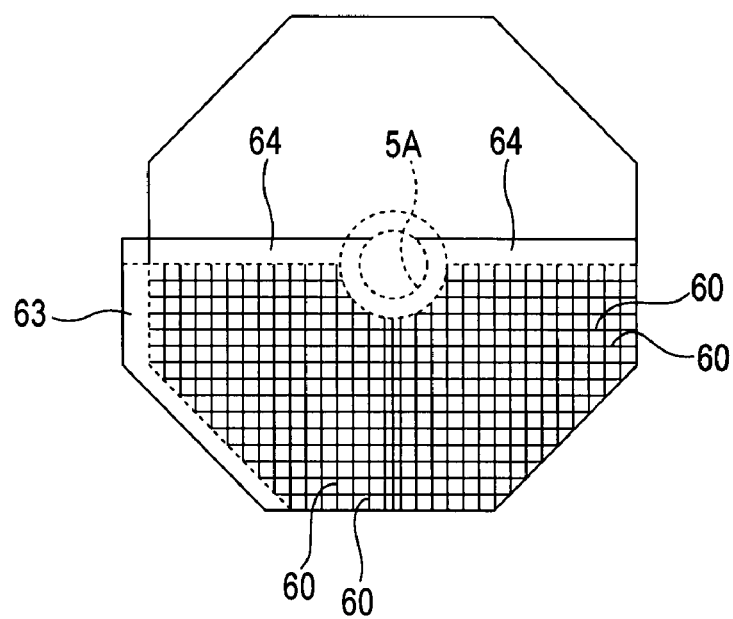
FIGS. 29A and 29B are plan views showing relationships between display regions and through-holes.
Figure 29B:
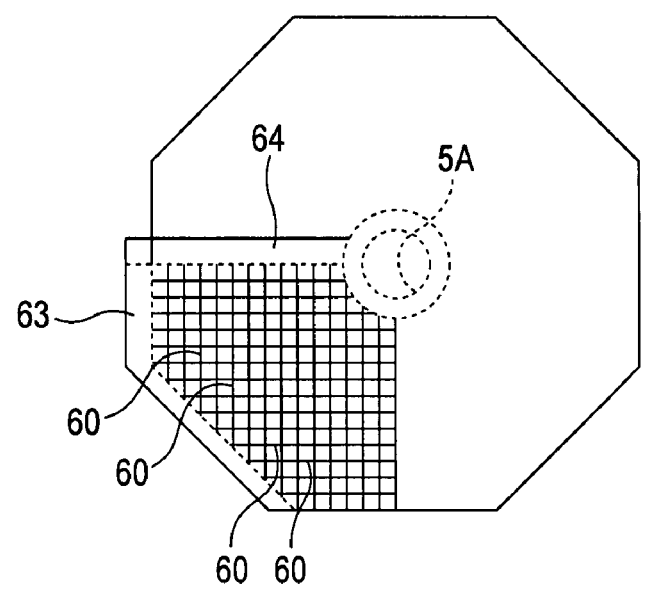

Although an entire avoided portion including a through-hole is formed in a display region of a display panel in the above embodiments, the invention is not limited thereto. For example, only part of the avoided portion may be formed in the display region of the display panel. As shown in FIG. 29A, if the display panel has a regular octagonal shape with the through-hole 5A formed in its center, the display region where the wiring lines 60 are arranged may be defined such that half the area of the through-hole 5A is disposed in the display region while the other half is disposed outside the display region. Alternatively, as shown in FIG. 29B, the display region where the wiring lines 60 are arranged may be defined such that a quarter of the area of the through-hole 5A is disposed in the display region while the rest is disposed outside the display region. Gate drivers 63 and data drivers 64 are shown in FIGS. 29A and 29B.

The active-matrix circuit boards according to the above embodiments can thus be applied to a display panel having a relatively narrow display region. In particular, the active-matrix circuit boards can readily be applied to a display panel having a narrow display region designed for suppressed power consumption and increased battery life.

The invention is not limited to the above embodiments, and various modifications are permitted without departing from the spirit of the invention. For example, although an electrophoretic dispersion is used as an electrooptical material to form electrophoretic elements for displaying an image in the above embodiments, a liquid crystal material may be used as the electrooptical material to form liquid crystal display elements. Alternatively, an organic electroluminescent (EL) material may be used to form organic EL elements.

In addition, although the displays according to the above embodiments of the invention are applied to wristwatches, they can also be applied to, for example, table clocks, wall clocks, standing clocks, or pocket watches.

In addition to clocks, the invention can be applied to a variety of instruments including pointers and a variety of displays including avoided portions other than through-holes.

What is claimed is:

1. An active-matrix circuit board comprising:
   a substrate including an avoided portion in a predetermined region thereof;
   one or more first pixel electrodes disposed around the avoided portion on the substrate, the first pixel electrodes having such a shape as to extend toward the avoided portion;
   second pixel electrodes disposed on the substrate, the first pixel electrodes being larger than the second pixel electrodes;
   pixel-driving circuits disposed on the substrate to drive the first and second pixel electrodes;
   wiring lines disposed on the substrate and connected to the pixel-driving circuits; and
   bypass line portions provided in the wiring lines so as to bypass the avoided portion, the bypass line portions being disposed under the first pixel electrodes.

2. The active-matrix circuit board according to claim 1, wherein the avoided portion includes a hole.

3. The active-matrix circuit board according to claim 1, wherein each of the first pixel electrodes is provided with at least one of the pixel-driving circuits.

4. The active-matrix circuit board according to claim 1, wherein the active-matrix circuit board includes only one first pixel electrode, the first pixel electrode being provided with a plurality of the pixel-driving circuits.

5. The active-matrix circuit board according to claim 1, wherein at least part of the avoided portion is disposed in a display region.

6. A display comprising:
a first substrate;
a second substrate disposed opposite the first substrate;
an electrooptical material layer held between the first and second substrates; and
a counter electrode disposed on a surface of the second substrate opposite the first substrate;
wherein the first substrate is the active-matrix circuit board according to claim 1; and
the pixel electrodes are disposed on a surface of the first substrate opposite the second substrate.

7. The display according to claim 6, wherein the electrooptical material is an electrophoretic dispersion including electrophoretic particles and a liquid dispersion medium in which the electrophoretic particles are dispersed.

8. An active-matrix circuit board comprising:
a substrate including an avoided portion in a predetermined region thereof, the avoided portion including a through-hole in the substrate;
pixel electrodes disposed on the substrate;
drive circuits disposed on the substrate to drive the pixel electrodes;
wiring lines disposed on the substrate, the wiring lines including power lines electrically connected to the drive circuits; and
one or more connection portions disposed in a region surrounding the avoided portion on the substrate, each of the connection portions being connected to at least two of the power lines.

9. The active-matrix circuit board according to claim 8, wherein some of the wiring lines include bypass portions bypassing the avoided portion, and
wherein the connection portions are disposed around the outermost circumference of the bypass portions of the wiring lines with respect to the avoided portion.

10. The active-matrix circuit board according to claim 8, wherein the connection portions are connected to all of the power lines.

11. The active-matrix circuit board according to claim 8, wherein the connection portions are disposed in an annular pattern so as to surround the avoided portion.

12. A display comprising:
a first substrate;
a second substrate disposed opposite the first substrate;
an electrooptical material layer held between the first and second substrates; and
a counter electrode disposed on a surface of the second substrate opposite the first substrate;
wherein the first substrate is the active-matrix circuit board according to claim 8; and
the pixel electrodes are disposed on a surface of the first substrate opposite the second substrate.

13. The display according to claim 12, wherein the electrooptical material is an electrophoretic dispersion including electrophoretic particles and a liquid dispersion medium in which the electrophoretic particles are dispersed.

14. An active-matrix circuit board comprising:
a substrate including an avoided portion in a predetermined region thereof;
pixel electrodes disposed on the substrate, one of the pixel electrodes surrounding the avoided portion in plan view;
drive circuits disposed on the substrate to drive the pixel electrodes; and
wiring lines disposed in a layer different from a layer in which the pixel electrodes are disposed on the substrate, the one of the pixel electrodes connecting some of the wiring lines in a region surrounding the avoided portion.

15. The active-matrix circuit board according to claim 14, wherein the one of the pixel electrodes connecting the wiring lines in the region surrounding the avoided portion is disposed in the region surrounding the avoided portion.

16. The active-matrix circuit board according to claim 14, further comprising an annular electrode disposed around the avoided portion in the same layer as the wiring lines to connect some of the wiring lines.

17. The active-matrix circuit board according to claim 14, wherein the wiring lines connected to the one of the pixel electrodes are wiring lines for supplying power to the drive circuits or for grounding the drive circuits.

18. A display comprising:
a first substrate;
a second substrate disposed opposite the first substrate;
an electrooptical material layer held between the first and second substrates; and
a counter electrode disposed on a surface of the second substrate opposite the first substrate;
wherein the first substrate is the active-matrix circuit board according to claim 14; and
the pixel electrodes are disposed on a surface of the first substrate opposite the second substrate.

19. The display according to claim 18, wherein the electrooptical material is an electrophoretic dispersion including electrophoretic particles and a liquid dispersion medium in which the electrophoretic particles are dispersed.

* * * * *